United States Patent
Akopian

(10) Patent No.: US 6,735,243 B1
(45) Date of Patent: May 11, 2004

(54) METHOD, APPARATUS AND SYSTEM FOR FAST ACQUISITION OF A SPREAD SPECTRUM SIGNAL

(75) Inventor: David Akopian, Tampere (FI)

(73) Assignee: Nokia Corporation, Espoo (FI)

( * ) Notice: Subject to any disclaimer, the term of this patent is extended or adjusted under 35 U.S.C. 154(b) by 598 days.

(21) Appl. No.: 09/708,966

(22) Filed: Nov. 8, 2000

(51) Int. Cl.[7] .................................................. H04B 1/69
(52) U.S. Cl. ...................................................... 375/150
(58) Field of Search ................................ 375/130, 136, 375/142, 145, 147, 150; 370/320, 335, 342, 441

(56) References Cited

U.S. PATENT DOCUMENTS

| | | | | |
|---|---|---|---|---|
| 5,910,948 A | * | 6/1999 | Shou et al. .................. | 370/335 |
| 6,137,433 A | * | 10/2000 | Zavorotny et al. ............ | 342/26 |
| 6,151,353 A | * | 11/2000 | Harrison et al. ............. | 375/136 |
| 6,567,462 B1 | * | 5/2003 | Brunner et al. .............. | 375/148 |
| 6,580,749 B1 | * | 6/2003 | Miura ......................... | 375/147 |

FOREIGN PATENT DOCUMENTS

WO    WO 99/26370    5/1999

* cited by examiner

Primary Examiner—Emmanuel P Bayard
(74) Attorney, Agent, or Firm—Ware, Fressola, Van Der Sluys & Adolphson LLP

(57) ABSTRACT

A system for acquiring a received spread spectrum signal having a code component, the acquiring including matching the phase of a replica of the code component to the phase of the received code component and also determining a possible shift in the carrier frequency away from a nominal carrier frequency, the acquiring having an intrinsic bandwidth that is substantially the inverse of a predetermined fraction of a code period and also having a design bandwidth that is a fraction of the intrinsic bandwidth including possibly the entire intrinsic bandwidth, the system including means for performing various correlations over sections of a code period, the number of sections determining the intrinsic bandwidth, and adjusting the design bandwidth to be possibly less than the intrinsic bandwidth, so as to alter the characteristics of the acquisition.

34 Claims, 10 Drawing Sheets

METHOD, APPARATUS AND SYSTEM FOR FAST ACQUISITION OF A SPREAD SPECTRUM SIGNAL

FIELD OF THE INVENTION

This method relates, in general, to CDMA (Code Division Multiple Access) spread spectrum receivers, and more specifically, to fast acquisition GPS (Global Positioning System) receivers.

BACKGROUND OF THE INVENTION

Spread spectrum communication in its basic form is a method of taking a data-signal that is used to modulate a sinusoidal carrier and then spreading its bandwidth to a much larger value, e.g. in a global positioning system (GPS) application by multiplying a single-frequency carrier by a high-rate binary (−1,1) pseudo-random noise (PRN) code sequence that is known to GPS users. Thus, the signal that is transmitted includes a data component, a PRN component, and a (sinusoidal) carrier component.

At the receiver, a synchronized replica of the transmitted PRN code is required to de-spread the data sequence. Initial synchronization, called acquisition, is followed by fine synchronization, which is called tracking.

The present invention relates to acquisition of a spread spectrum signal. Acquisition is the process by which the replica PRN code is synchronized (to within a small timing offset) with the code conveyed by the received signal either for the first time or after losing a previously acquired signal, and also by which the carrier frequency of the received signal is determined. Thus, to acquire a signal, an acquisition system must accurately determine any frequency-shifting of the received signal from the transmitted frequency in order to accurately wipeoff (remove) the carrier signal. Frequency-shifting can be caused by relative motion of the transmitter and receiver (Doppler-shifting) as well as by clock inaccuracies (so that a transmitter and receiver sometimes do not agree on what is in fact the same frequency). The carrier frequency-shifting results in a modulation of a code component after carrier wipe-off in the receiver. Thus, in acquiring a signal, it is also necessary that the replica code sequence be not only time-aligned with the received code sequence, but also modulated to compensate for the frequency-shifting so as to fully eliminate the PRN sequence and leave behind only the data conveyed by the received signal. The acquisition process is therefore a two-dimensional search, a search both in code phase and in frequency.

For GPS signals the search interval in the frequency domain can be as large as +/−6 kHz. In addition, the phase of the received code relative to the replica can be any possible value of code phase, due to uncertainties in position of the satellite and time of transmission of the received signal. A PRN code period is typically 1023 chips, the term chips being used to designate bits of code conveyed by the transmitted signal, as opposed to bits of data. Thus, the acquisition module of a receiver must search a 12 kHz-wide interval with 1023×$k_s$ different code phases, where $k_s$ denotes the number of samples per chip.

Ordinary GPS receivers, i.e. those designed only for operation with unobstructed satellites, search for the frequency shift with a granularity of around 1 kHz. Thus, such receivers must search 12×1023×$k_s$ different code/frequency combinations.

A GPS receiver designed for indoor operation must have an operating mode with equivalent noise bandwidth on the order of 10 Hz in the acquisition stage. Even with an equivalent noise bandwidth as small as 10 Hz though, for reliable tracking some post-detection filtering must still be performed as well as some further refining of the value determined for the carrier frequency in the acquisition stage. The granularity of 10 Hz requires that the receiver search 1200×$k_s$×1023 different code/frequency combinations and makes the sequential search so time-consuming as to be unrealistic, motivating the use of parallel and fast search methods.

Some existing methods often intentionally modulate the signal being acquired, sequentially or in parallel, to advance the search in frequency.

Existing methods are promising and useful in many situations, but what is needed is a spread spectrum acquisition system that performs the code/frequency acquisition search in a way that is computationally efficient and still as accurate as is needed for a given application. In other words, what is needed is a way to tailor an acquisition system so as to be able to balance the competing requirements for accuracy and speed appropriately for a given application.

SUMMARY OF THE INVENTION

Accordingly, the present invention provides a method, a corresponding apparatus, and a corresponding system, for acquiring a received spread spectrum signal, the received signal having a carrier component at a carrier frequency, a code component having a code period, and a data component, the acquiring including matching the phase of a replica of the code component to the phase of the received code component and also determining a possible shift in the carrier frequency away from a nominal carrier frequency, the acquiring having an intrinsic bandwidth that is substantially the inverse of a predetermined fraction of a code period and also having a design bandwidth that is a fraction of the intrinsic bandwidth including possibly the entire intrinsic bandwidth, the method comprising the steps of: obtaining samples of the received signal spanning one code period after the received signal is demodulated at the nominal carrier frequency, the obtaining of the samples being performed at a sampling rate, the samples being distributed over a number of sections as a predetermined number of samples per section, the inverse of the product of the number of sections and the code period determining the intrinsic bandwidth; determining a first frequency from among an ordered set of first frequencies spanning a frequency interval to be searched for the possible shift in the carrier frequency; mixing a sinusoid at the first frequency with the samples of the received signal, to provide a once-mixed received signal segment; assigning a value to the replica code phase, the assigning of a replica code phase amounting to associating a value of the replica code phase with a given position of the replica compared to the received signal; performing a series of section correlations with the sections of replica code of the once-mixed received signal segment, the samples spanning one code period, each section correlation being calculated using one section of the replica, phase-shifted by the replica code phase, the first correlation in the series being performed over the samples spanning the first section, and so on; determining an ordered set of second frequencies, the second frequencies lying in the interval between the selected first frequency and the next first frequency in the ordered set of first frequencies; coherently combining each of the section correlations using for the first section correlation a compensating factor including a sinusoid derived from the first second frequency in the ordered set of second frequencies, and so on, to provide a correlation with a code period of the replica at the code phase compensated by a compensating factor including a sinusoid derived from each of the frequencies in the ordered set of second frequencies; and repeating, for each further replica code phase in the ordered set of replica code phases, the series of section correlations and the coherent combining of the section correlations for each replica code phase a number of times equal to the number of frequencies in the ordered set of second frequencies using a different compensating factor for each coherent combining, the compensating factor for the first coherent combining including a sinusoid derived from the first second frequency in the ordered set of second frequencies, and so on, to determine a correlation at each of the further replica code phases and, for each of such replica code phases, at each of the second frequencies; wherein the parameter of design bandwidth is adjusted so as to alter characteristics of the acquisition.

In a further aspect of the invention, to achieve a desired tradeoff between design bandwidth in the sense of a portion of the frequency separation between successive first frequencies, cancellation of aliasing introduced by integration of the received signal with the replica code in computing a correlation of the received signal with the replica code, and frequency resolution, two parameters from among the set of three parameters consisting of the design bandwidth B, the number of second frequencies $N_f$, and frequency resolution $f_{res}$, indicating the spacing between adjacent frequencies in the ordered set of second frequencies are independently selected, and the other parameter is determined based on the relation, $$B = f_{res} \cdot N_f$$

In yet another further aspect of the invention, the correlations used in the acquisition process are continued over several code periods, the correlations over the several code periods being coherently combined (i.e. taking into account both the sign and the magnitude of each term being combined) using compensation factors based on different trial second frequencies.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
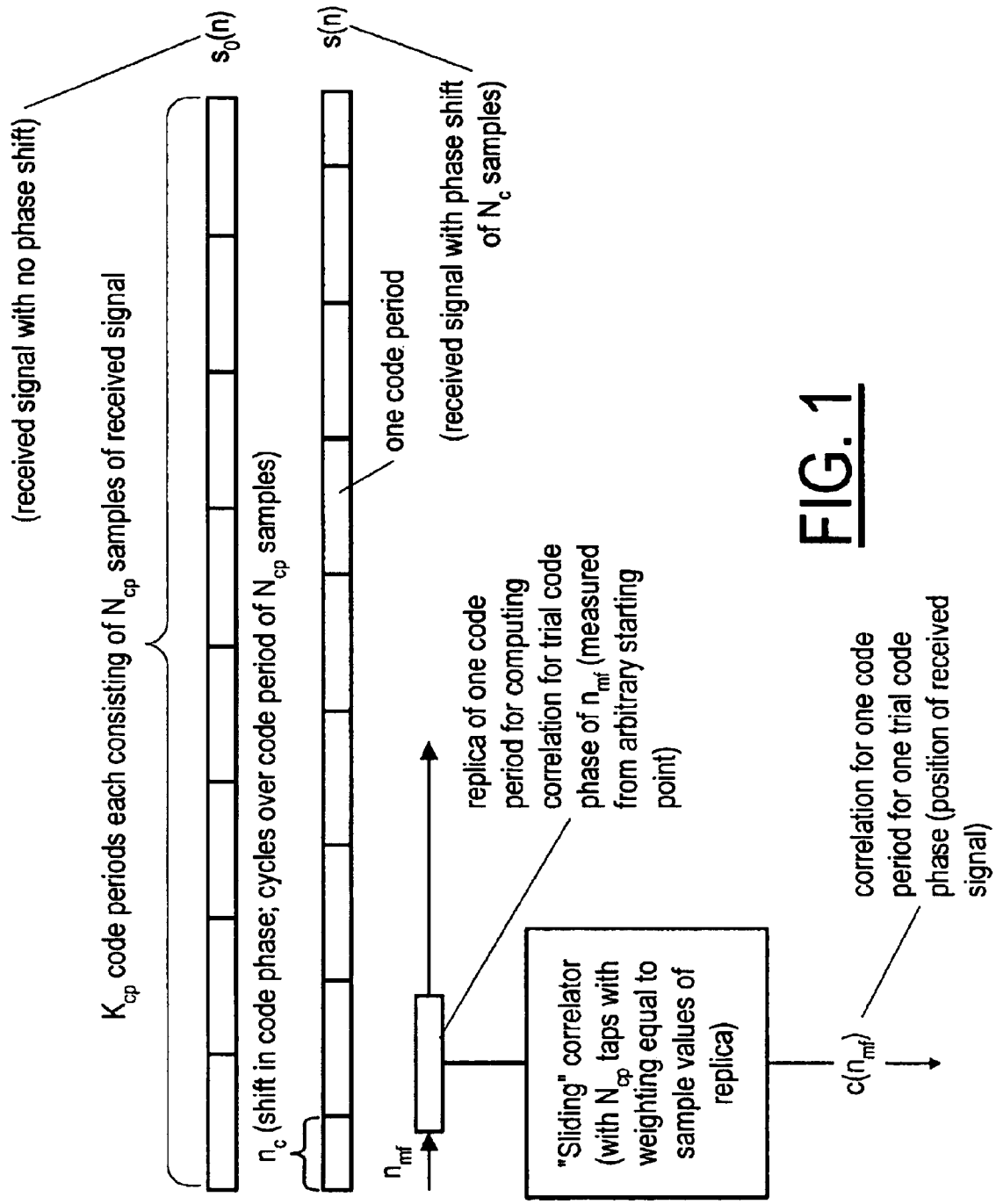
FIG. 1 is a schematic of an aspect of carrier and code acquisition being performed in a spread spectrum receiver of the type in which the present invention can be embodied, the schematic indicating in particular that the receiver performs correlations of a received (spread spectrum) signal with a replica of the code component of a spread spectrum signal for various phases of the replica relative to the received signal.

The present invention will now be described in connection with a receiver for receiving a direct sequence (DS) spread spectrum signal transmitted by a satellite vehicle. A global positioning system (GPS) signal transmitted by a satellite vehicle is an example of a DS spread spectrum signal. It should be understood however, that the present invention, a system for acquiring a spread spectrum signal, is not limited to acquiring a spread spectrum signal in any particular context, such as GPS, nor is it limited to acquiring a particular kind of spread spectrum signal. As will be clear from what follows, a system according to the present invention for acquiring a spread spectrum signal can be of use in any application in which a spread spectrum signal is to be acquired, as long as the spread spectrum signal includes a code component and a carrier component.

Before describing the invention and its preferred embodiment, notation and a description of the acquisition process according to various approaches are given.

Introduction to Approach to Acquisition Used in the Present Invention

Notation and Context

In what follows, it is assumed that the carrier is wiped-off the received signal, and we are processing the digitized signal after analog to digital conversion. The initially periodic signal is corrupted by noise and shifted in frequency due to the Doppler effect and other causes (including differences in the rates of the transmitter and receiver clocks), and can be modeled as $$x(n) = s(n) + x_{noise}(n)$$

where the received signal at the receiver is $$s(n) = s_0(n - n_c)e^{j(w_D n + \phi)} = s_0(n - n_c)e^{j(2\pi f_D n + \phi)}$$

in which $$s_0(n) = A \cdot d\{floor(n/N_{dp})\} r(n \bmod N_{cp}).$$

$s(n)$ is the received signal at the receiver, $x_{noise}(n)$ is the noise component of the received signal, $A$ is a scaling factor, $s_0(n)$ is the signal with zero code phase and Doppler frequency offsets, $n_c$ is the unknown code phase of the received signal (with respect to the replica code) measured in for example samples, $N_{dp}$ is the duration of a data bit (in samples), $N_{cp}$ is the code period (in samples), $f_D$ is the unknown frequency shift appearing because of relative motion of the receiver and the transmitter and because of other causes, $d(n) \in \{-1, 1\}$ is the sample value obtained in sampling a data bit, $r(n) \in \{-1, 1\}$ is a one-code-period-long sample of the replica code (i.e. the spreading sequence sampled for one period).

The data bit duration is usually several code periods (usually 20 code periods in the case of a GPS signal). The effect of the data component of the received signal is to slowly modulate the received signal, and as long as correlations are performed over only a single code period or a relatively small number of code periods, the effect of the data modulation can be ignored. Without loss of generality, the common scaling factor $Ae^{j\phi}$ is also ignored since it does not affect the system design. Thus we assume here a normalized received signal given by, $$x(n) = r\{(n - n_c) \bmod N_{cp}\} e^{jw(n - n_c) + x_{noise}(n)}.$$

Correlation Over Several Code Periods Without Frequency Shift Compensation

The acquisition system estimates two unknowns: the code phase $n_c$, measured with respect to an arbitrary time or chip reference, and the (carrier) frequency shift $f_D$ (or the equivalent angular frequency $w_D$ that is here normalized to the sampling frequency $f_s$ and so is given by $w_D = 2\pi f_D / f_s = 2\pi f_D \Delta T$). The code phase is estimated based on calculating a correlation of the replica code with the incoming signal. The correlation is calculated using a sliding correlator, having taps with weights equal to the sample values of the replica, for successive positions of the received signal in the sliding correlator. An equivalent perspective is one in which the sliding correlator slides its replica over the received signal and computes a correlation for each successive position of the replica and so for different replica phases $n_{mf}$ measured with respect to the same arbitrary time or chip reference as the actual code phase $n_c$, the quantity $n_{mf}$ being a cyclic variable with period equal to the number of samples of the replica. When the replica phase is equal to the (actual) code phase, the correlation is a maximum (i.e. unity, if not degraded by a carrier frequency shift or modulation of the received signal by the data it conveys). From the perspective that the replica slides over the received signal, the correlation can be said to be a function c of the replica phase $n_{mf}$, i.e. $c = c(n_{mf})$, ignoring for the moment the affect of any shift in the carrier frequency.

FIG. 1 illustrates the notion of a sliding correlator computing a correlation $c_i(n_{mf})$ of a replica with a signal fragment with the same duration as the code period (the $i^{th}$ fragment counting from an arbitrary starting point) of the received signal, given by $$c_i(n_{mf}) = \frac{1}{N_{cp}} \sum_{n=0}^{N_{cp}-1} r(n \bmod N_{cp}) x(i \cdot N_{cp} + n + n_{mf}), \quad (1A)$$

the argument $i \cdot N_{cp} + n + n_{mf}$ indicating that the correlation is over $i^{th}$ the set of $N_{cp}$ samples of the received signal (starting counting from an arbitrary time or sample reference), $N_{cp}$ being the number of samples acquired during one code period. As suggested by FIG. 1, it is also possible to compute a correlation over several code periods, i.e. to add correlations over successive periods of the received signal.

The code component is usually a pseudo random number (PRN) code. Due to special properties of such codes, the correlator output is significantly smaller when the replica is not aligned with the received code, and the correlator output is maximal at the position at which the replica phase coincides with that of the code component of the received signal. With the phase of replica taken as $n_{mf}$, the correlation over several code periods $K_{cp}$ is given by, $$c(n_{mf}) = \frac{1}{K_{cp}} \sum_{i=0}^{K_{cp}-1} c_i(n_{mf}),$$

which expands to $$c(n_{mf}) = \frac{1}{K_{cp} N_{cp}} \sum_{n=0}^{K_{cp} N_{cp}-1} r(n \bmod N_{cp}) x(n + n_{mf}) \quad (1B)$$

$$= \frac{1}{K_{cp} N_{cp}} \sum_{n=0}^{K_{cp} N_{cp}-1} r(n \bmod N_{cp}) r\{(n - n_c + n_{mf}) \bmod N_{cp}\} e^{jw(n - n_c + n_{mf})} +$$

$$\frac{1}{K_{cp} N_{cp}} \sum_{n=0}^{K_{cp} N_{cp}-1} r(n \bmod N_{cp}) x_{noise}(n - n_c + n_{mf})$$

$$\approx \begin{cases} 1 + \varepsilon_1, & \text{for } n_c = n_{mf}, \text{ and } w = 0 \\ \varepsilon_2, & \text{for } |n_c - n_{mf}| > N_{ch} \end{cases}$$

in which $N_{ch}$ is the number of samples per chip of the code, and in which $\varepsilon_1$ and $\varepsilon_2$ are random data dependent on the noise component of the received signal and the integration length, and are small for usual operational signal-to-noise ratios of a receiver.

In a sliding correlator approach to acquisition, one code period for replica length is used, and samples of the received signal sequentially shift into a block of shift registers having a combined length $N_{cp}$ (spanning one code period). Each further received sample shifts the already received samples one position forward in the block of shift registers, and the portion of the received signal so obtained, having length $N_{cp}$, is correlated with the replica. The correlation is the summation of the element-wise multiplication of the replica and the portion of the received signal in the shift register block, as indicated by equation (1A) for a correlation over a single code period, or equation (1B) for a correlation over a number $K_{cp}$ of code periods.

Figure 2:
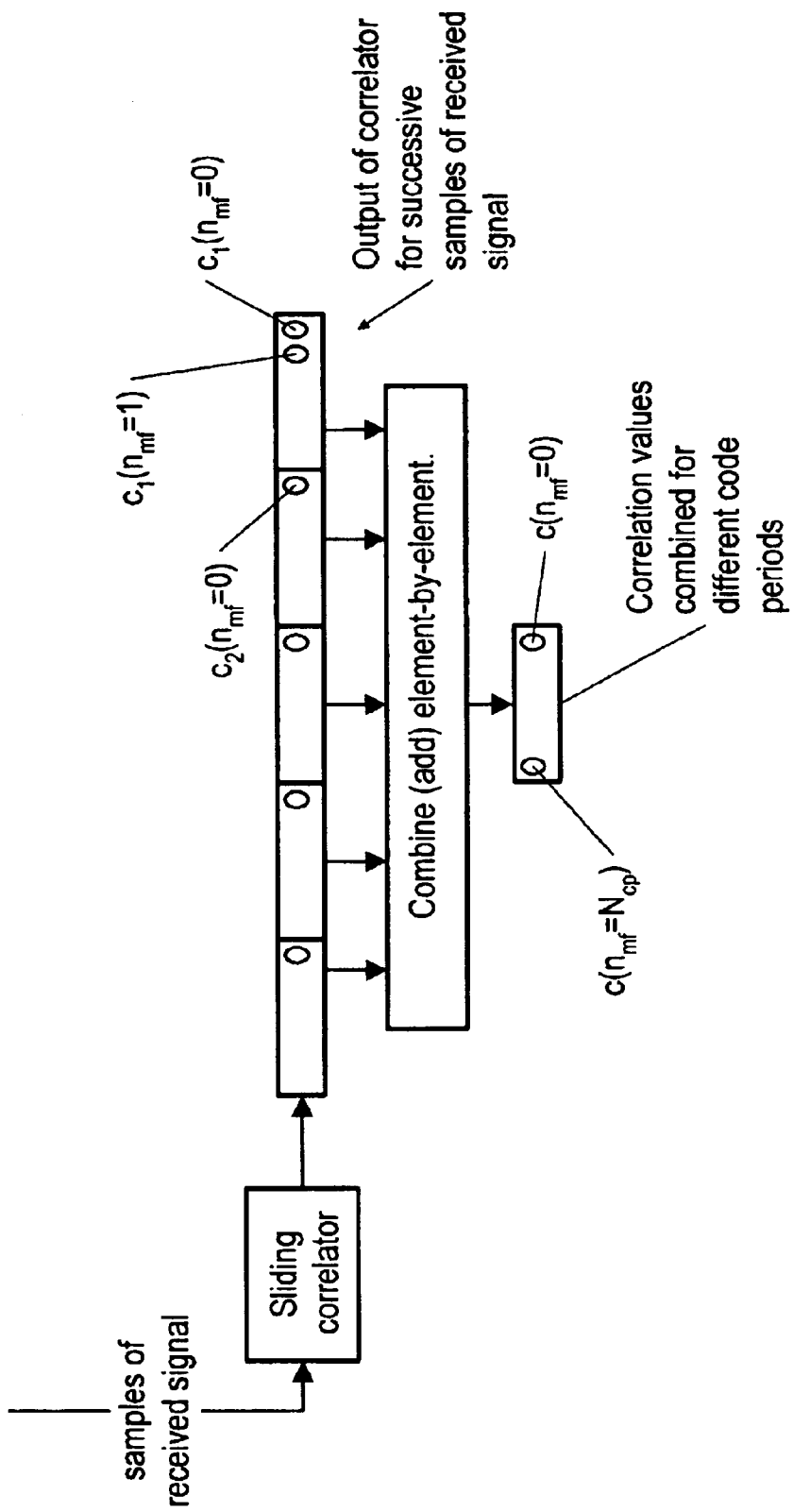
FIG. 2 is a schematic/block diagram of an acquisition process according to the prior art showing correlations being performed for different code periods, correlations which are then combined to provide what might be called super correlations.

FIG. 2 illustrates performing a correlation over several code periods, what might be called a super correlation, according to equation (1B).

Correlation Over Several Code Periods With Frequency Shift Compensation

Any frequency shift in the received signal should be compensated for prior to calculating the correlation between the received signal and the replica because a frequency shift modulates the received signal via the sinusoid $\exp\{jw(n-n_c+n_{mf})\}$ (see equation (1B)), disturbing the correlation. But the frequency shift, if any, is not known a priori; thus, a two-dimensional search must be performed in acquiring the received signal, a search for both the code phase and any frequency shift.

If $\hat{w}$ is used to represent a trial frequency shift (as opposed to the actual frequency shift represented by w), then the received signal should be demodulated using a compensating factor of $\exp(-j\hat{w}n)$, where n is an index corresponding to the different samples of the received signal (and so corresponds indirectly to a series of instants of time). Using the compensating factor of $\exp(-j\hat{w}n)$, the correlation of equation (1B) becomes, $$c(n_{mf}, \hat{w}) = \frac{1}{K_{cp}N_{cp}} \sum_{n=0}^{K_{cp}N_{cp}-1} r(n \bmod N_{cp})x(n+n_{mf})e^{j\hat{w}n} \quad (2)$$

$$= \frac{1}{K_{cp}N_{cp}} \sum_{n=0}^{K_{cp}N_{cp}-1} r(n \bmod N_{cp})r\{(n-n_c + n_{mf}) \bmod N_{cp}\}e^{jw(n-n_c+n_{mf})}e^{-j\hat{w}n} +$$

$$\frac{1}{K_{cp}N_{cp}} \sum_{n=0}^{K_{cp}N_{cp}-1} r(n \bmod N_{cp})x_{noise}(n-n_c + n_{mf})e^{-j\hat{w}n}$$

$$\approx \begin{cases} 1+\varepsilon_1, & \text{for } n_c = n_{mf}, \text{ and } w = \hat{w} \\ \varepsilon_2, & \text{for } |n_c - n_{mf}| > N_{ch}. \end{cases}$$

Figure 3:
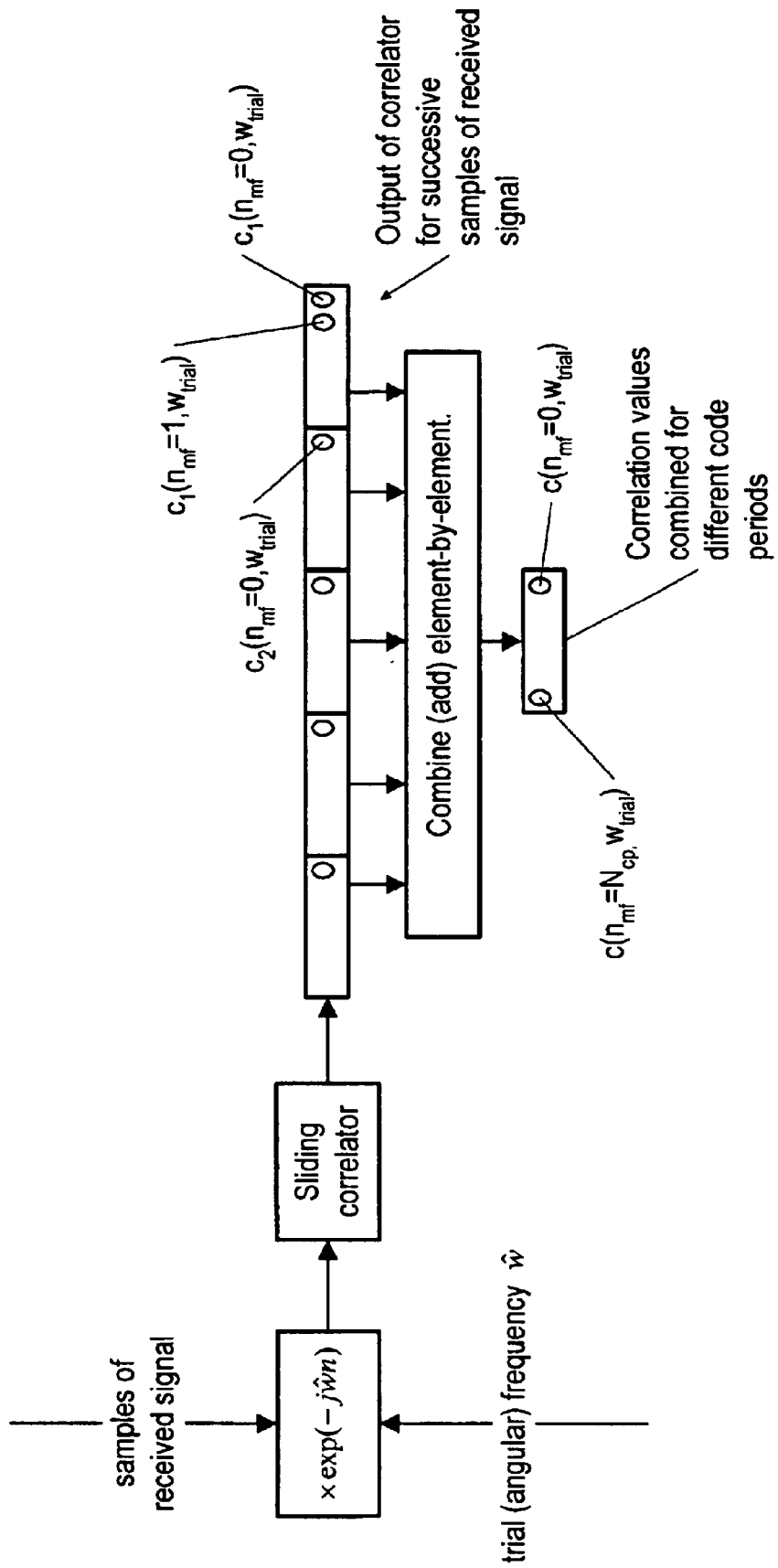
FIG. 3 is a schematic/block diagram of an acquisition process also according to the prior art, an acquisition process similar to that indicated in FIG. 2 but modified so as to account for any shift in frequency of the carrier component of the received signal, caused for example by relative motion of the transmitter and receiver.

Thus, when the trial (or assumed) frequency $\hat{w}$ equals the actual frequency shift w, the correlation is undegraded, i.e. when $n_c=n_{mf}$, a calculation according to equation (2) yields a value of unity. FIG. 3 illustrates calculating the correlation between the code component of the received signal and a replica according to equation (2).

The complexity (computational burden) of the approach to acquisition embodied in equation (2), i.e. a brute force trial and error search for both the frequency shift and the code phase, is quite high; a correlation must be performed for each trial frequency shift. The complexity of the acquisition process can be reduced by taking advantage of the fact that the compensation for any frequency shift is important only when the replica is aligned with the code component of the received signal. For misaligned positions and typical PRN codes, the correlation is small (because of the properties of typical PRN codes). For the aligned position of the replica relative to the code component of the received signal, the code component is wiped off and the effect of the sliding correlator is equivalent to a filter with unity weighted taps applied to a signal without spread spectrum modulation. Such a sliding correlator has an intrinsic bandwidth that is the inverse of the code period (1 kHz in case of a GPS signal). Not all of the intrinsic bandwidth must be used, however, and in the present invention, the amount of the intrinsic bandwidth that is used is chosen to give a balance between bandwidth (used), aliasing, and frequency resolution. (In case of using a multi-section sliding correlator, as discussed below, the intrinsic bandwidth of the sliding correlator is the number of sections multiplied by the intrinsic bandwidth for a single-section sliding correlator.)

To reduce the complexity of the acquisition process, a frequency shift compensation can be performed before computing the correlation in coarse steps of up to approximately 1 kHz for a GPS signal, followed by a fine frequency shift compensation in fine steps of less than 1 kHz (or whatever coarse step is used) on the output of the correlation. The choice of a particular coarse frequency step, a design choice, is limited to values less than the intrinsic bandwidth of the sliding correlator, which is in turn dictated by the code period. The value chosen for the coarse frequency step is here called the design bandwidth.

In an approach based on coarse steps followed by fine steps, the $K_{cp}N_{cp}$ samples of the received signal over which a correlation is to be performed are multiplied (mixed) by a coarse compensation sinusoid $\exp(-jw_c n)$, with the index n indicating the current incoming signal sample. Then the one-code-period-long correlation is performed in a correlator (inner summation). The one-code-period-long correlation results are combined a number of times equal to the number of fine frequency shifts $w_f$ (outer summation). This is performed for each code phase $n_{mf}$. Thus, in an approach based on coarse steps followed by fine steps, a correlation is calculated according to, $$c(n_{mf}, \hat{w} = w_c + w_f) = \frac{1}{K_{cp}N_{cp}} \sum_{n=0}^{K_{cp}N_{cp}-1} r(n \bmod N_{cp})x(n+n_{mf})e^{-j\hat{w}n} \quad (3)$$

$$= \frac{1}{K_{cp}N_{cp}} \sum_{n=0}^{K_{cp}N_{cp}-1} r(n \bmod N_{cp})x(n+n_{mf})e^{-j(w_c+w_f)n}$$

$$= \frac{1}{K_{cp}N_{cp}} \sum_{n=0}^{K_{cp}N_{cp}-1} r(n \bmod N_{cp})\{x(n+n_{mf})e^{-jw_c n}\}e^{-jw_f n}$$

$$= \frac{1}{K_{cp}N_{cp}} \sum_{n=0}^{K_{cp}N_{cp}-1} r(n \bmod N_{cp})\tilde{x}(n+n_{mf})e^{-jw_f n}$$

$$= \frac{1}{K_{cp}N_{cp}} \sum_{k_{cp}=0}^{K_{cp}-1} \sum_{n_{cp}=0}^{N_{cp}-1} r(n_{cp})\tilde{x}\left(n_{cp} + k_{cp}N_{cp} + n_{mf}\right)e^{-jw_f(n_{cp}+k_{cp}N_{cp})}$$

$$= \frac{1}{K_{cp}N_{cp}} \sum_{k_{cp}=0}^{K_{cp}-1} \sum_{n_{cp}=0}^{N_{cp}-1} r(n_{cp})x(n_{cp} + k_{cp}N_{cp} + n_{mf})e^{-jw_c(n_{cp}+k_{cp}N_{cp})}e^{-jw_f(n_{cp}+k_{cp}N_{cp})}$$

-continued $$\approx \frac{1}{K_{cp}N_{cp}} \sum_{k_{cp}=0}^{K_{cp}-1} \left( \sum_{n_{cp}=0}^{N_{cp}-1} r(n_{cp}) x(n_{cp} + k_{cp}N_{cp} + n_{mf}) e^{-jw_c(n_{cp}+k_{cp}N_{cp})} \right) e^{-jw_f k_{cp} N_{cp}}$$

$$\equiv \frac{1}{K_{cp}} \sum_{k_{cp}=0}^{K_{cp}-1} c(n_{mf}, k_{cp}, w_c) e^{-jw_f k_{cp} N_{cp}}$$

replacing n of equation (2) with new $n = n_{cp} + k_{cp} N_{cp}$, and using as an approximation, $$\exp\{-jw_f(n_{cp}+k_{cp}N_{cp})\} \approx \exp\{-jw_f k_{cp} N_{cp}\}.$$

The quantity $c(n_{mf}, k_{cp}, w_c)$ is here called a correlation, meaning a one-code-period-long (full) correlation for the code period indicated by the index $k_{cp}$, and the quantity $c(n_{mf}, \hat{w})$, a (compensated) correlation over several code periods, is here called a super correlation. Equation (3), an approximation of equation (2), is valid only for frequency shifts within a coarse frequency step of the (trial) coarse frequency being used in the correlation.

In the present invention discussed below (beginning with FIG. 5), correlations are also computed in a way similar to what is indicated by equation (3), but in the present invention, the correlations are computed over sections of a code period using a multi-section correlator (one section for each fraction of the code period), not an entire code period, as in equation (3). In equation (3), the (full) correlations over an entire code period are combined into a single, super correlation over several code periods, and in the present invention, as discussed below in connection with FIG. 5, several section correlations are combined again into a super correlation, the super correlation then again amounting to a correlation over several code periods.

In equation (3), one correlation calculation for each possible code phase $n_{mf}$ is used to check for different fine frequency shifts in a 1 kHz range about a trial coarse frequency shift. More specifically, for one fine frequency one needs several sequential outputs of the correlator corresponding to the same phase. With a sliding correlator type implementation, the sequential outputs for the given phase are one code period apart. The index $k_{cp}$ references those sequential outputs; it specifies a particular correlator output value, for a particular code phase, and several such output values are needed to perform the correlation computations for a fine frequency, the outputs being combined using a compensation factor that depends on the fine frequency. In other words, perform the following steps:

1. As each new code period of signal is received, calculate one time (for each code phase) the quantity, $$c(n_{mf}, k_{cp}, w_c) = \sum_{n_{cp}=0}^{N_{cp}-1} r(n_{cp}) \bar{x}\left( \overline{n_{cp} + k_{cp} N_{cp}} + N_{mf} \right)$$

for $k_{cp} = 0, \ldots, K_{cp}-1$ and store the results; and

2. Calculate the super correlation $c(n_{mf}, \hat{w})$ according to, $$c(n_{mf}, \hat{w} = w_c + w_f) = \frac{1}{K_{cp}N_{cp}} \sum_{k_{cp}=0}^{K_{cp}-1} c(n_{mf}, k_{cp},, w_c) e^{-jw_f k_{cp} N_{cp}}$$

for each different fine frequency (at each code phase $n_{mf}$).

Figure 4:
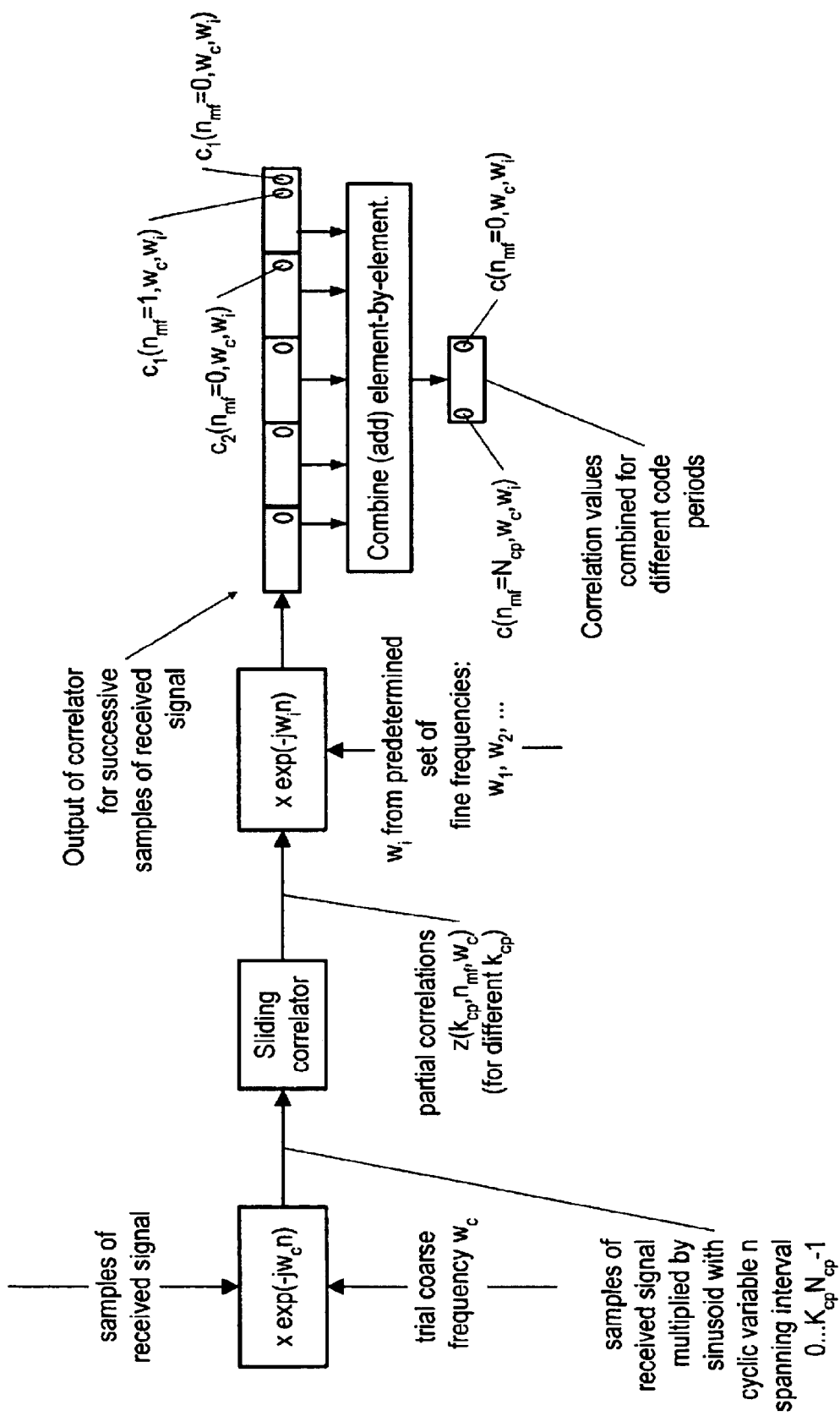
FIG. 4 is a schematic/block diagram of an acquisition process again according to the prior art and similar to that indicated in FIG. 3 but modified to provide faster acquisition by performing the search for the shift in carrier frequency in a coarse stage followed by a fine stage.

The approach according to equation (3) is illustrated in FIG. 4.

The approach according to equation (3) has two drawbacks. First, the search for the fine frequency shift is restricted to a 1 kHz range about each coarse frequency (in a GPS application), because the approximation of $c(n_{mf}, \hat{w})$ given by equation (3) degrades outside of the 1 kHz range. The searching for the fine frequency shift is usually done using calculations at the different possible fine frequency shifts performed in parallel, while the coarse frequency compensation is performed on the input to the correlation calculation. Second, there is aliasing introduced by the integration (summation) of the received signal with the replica code in computing the correlation of the received signal with the replica code, i.e. the summation leads to false peaks in the output of the correlation calculation.

The Present Invention: Acquisition Parameterized for Balancing Aliasing Cancellation, Resolution, and Bandwidth To combat aliasing and at the same time increase parallelism (bandwidth) in the acquisition process, two contradictory goals, the correlation process can be split into several section correlations, each performed using only a fraction of the $k_{cp}N_{cp}$ samples of the received signal, or in other words the samples in a section of the received signal. Each such section correlation can then be implemented using a section of a multi-section sliding correlator.

An acquisition system using such a multi-section sliding correlator analyzes the alignment of the replica code with the code component of the received signal by correlating the sections of the replica with the sections of the received signal saved at the current stage (corresponding to the position of the received signal) in the shift register block of the multi-section sliding correlator. The (full) correlation, for each fine frequency, of the replica with the one-code-period-long portion of the received signal is obtained by combining properly the section correlations for each fine frequency.

The correlation over $K_{cp}N_{cp}$ samples can be implemented in various ways, but in any implementation, one code period of signal ($N_{cp}$ samples) resides in the shift register block at any moment of time. Then, for a sliding correlator of $N_{se}$ sections, the $N_{se}$ outputs are saved for each value of $n_{mf}$, i.e. for each position in turn of the received signal relative to the replica. Thus the outputs for $n_{mf} = 0, 1, \ldots, N_{cp}-1$ for each section are saved. After the received signal shifts through $N_{cp}$ positions, the value of the trial code phase $n_{mf}$ returns to 0 to cycle again through $N_{cp}$ values, and the outputs from the different sections can be combined with corresponding outputs from the previous cycle. The process continues until $K_{cp}N_{se}$ section outputs are available for each value of $n_{mf}$. The process therefore uses $K_{cp}N_{cp}$ samples, providing outputs at $K_{cp}N_{cp}$ different stages (positions of the received signal). In one implementation, the section outputs for a given $n_{mf}$ are accumulated (stored) one by one until all such $K_{cp}$ are stored. They are then multiplied by a compensation factor, corresponding to a particular fine frequency and section number, and added to produce a unique output for that fine frequency and corresponding to the given $n_{mf}$. In another implementation, instead of accumulating the section outputs for each $n_{mf}$ performing the correlation calculation after all necessary section outputs are stored to obtain the correlation for a particular fine frequency and code phase $n_{mf}$, an accumulating variable, initialized to zero, is used and each section output is multiplied by the compensation factor for the particular fine frequency being tried and added the accumulating variable as soon as the section output becomes available.

The section correlations from the different sections of the sliding correlator are combined using particular coefficients (compensation factors). To determine what compensation factors should be used, consider the case when the replica and the code component of received signal are aligned. Then component-wise multiplication of the replica with the code component of the received signal wipes off the code component, and what is left in the received signal is modulation by the data being conveyed by the received signal and sinusoidal modulation due to any frequency shift.

Let us introduce notations for use in describing how to combine the outputs of the different sections of the sliding correlator. $N_{ss}$ is the number of samples in one section of the sliding correlator (or one subepoch of the code period), and corresponding to $N_{ss}$ is a dummy index $n_{ss}=0, \ldots, N_{ss}-1$ spanning all the samples within one section. $N_{se}$ is the number of subepochs, having an associated dummy index $n_{se}=0, \ldots, N_{se}-1$. In case of an implementation in which successive full correlations are added for several code periods, $K_{cp}$ is again the number of code periods (epochs) for combining of successive full correlations, with an associated dummy index $k_{cp}=0, \ldots, K_{cp}-1$. In case of an implementation in which successive full correlations or successive combined full correlations are added in a way that ignores any phase relationship, i.e. non-coherently, $N_c$ is the number of such noncoherent additions, and $n_c=0, \ldots, N_c-1$ is an associated dummy index.

Thus, in terms of the notation of equations (1B), (2) and (3), $N_{cp}=N_{ss}N_{se}$, and in an embodiment in which $K_{cp}$ successive full correlations are combined to yield a super correlation, the total number of samples used in the super correlation is $N=N_{ss}N_{se}K_{cp}$, and $n=n_{ss}+n_{se}N_{ss}+k_{cp}N_{ss}N_{se}$ is a dummy index ranging over all such N samples (and so corresponding to different instants of time, since each sample arrives at a different instant of time).

As explained above, according to the present invention, super correlations analogous to the prior art super correlations given by equation (3) are calculated. Beginning with the point in equation (3) at which the correlation is first expressed in terms of a summation over the data points in a code period and also over the number of code periods, i.e.

$$c(n_{mf}, \hat{w} = w_c + w_f) = \frac{1}{K_{cp}N_{cp}} \sum_{k_{cp}=0}^{K_{cp}-1} \sum_{n_{cp}=0}^{N_{cp}-1} r(n_{cp})\tilde{x}(n_{cp} + k_{cp}N_{cp} + n_{mf})e^{-jw_f(n_{cp}+k_{cp}N_{cp})},$$

and using $n_{cp}=n_{ss}+n_{se}N_{ss}$ to allow breaking the first summation into a summation over, the number $N_{ss}$ of data points in a section and then over the number $N_{se}$ of sections making up a code period, the super correlation becomes, $$c(n_{mf}, \hat{w} = w_c + w_f) = \frac{1}{K_{cp}N_{cp}} \sum_{k_{cp}=0}^{K_{cp}-1} \sum_{n_{se}=0}^{N_{se}-1} \sum_{n_{ss}=0}^{N_{ss}-1} r(n_{ss} + n_{se}N_{ss})\tilde{x}(n_{ss} + n_{se}N_{ss} + k_{cp}N_{cp} + n_{mf})e^{-jw_f(n_{ss}+n_{se}N_{ss}+k_{cp}N_{cp})} \quad (3a)$$

$$\approx \frac{1}{K_{cp}N_{cp}} \sum_{k_{cp}=0}^{K_{cp}-1} \sum_{n_{se}=0}^{N_{se}-1} \left( \sum_{n_{ss}=0}^{N_{ss}-1} r(n_{ss} + n_{se}N_{ss})x(n_{ss} + n_{se}N_{ss} + k_{cp}N_{cp} + n_{mf})e^{-jw_c(n_{ss}+n_{se}N_{ss}+k_{cp}N_{cp})} \right)$$

$$\equiv \frac{1}{K_{cp}N_{cp}} \sum_{k_{cp}=0}^{K_{cp}-1} \sum_{n_{se}=0}^{N_{se}-1} c(n_{mf}, k_{cp}, n_{se}, w_c)e^{-jw_f(n_{se}N_{ss}+k_{cp}N_{cp})}$$

where $c(n_{mf},k_{cp},n_{se},w_c)$ is here called a section correlation, and is a correlation for the $n_{se}^{th}$ section. Thus, equation (3a) computes first a section correlation for each section, via the innermost summation working in combination with the middle summation, but in the process accumulates the section correlations into a correlation for a single code period. Likewise, the outermost summation, the summation over the number of code periods (i.e. over $k_{cp}$) and the middle summation (over $n_{se}$) in combination compute the correlation over $K_{cp}$ code periods, i.e. a super correlation.

Equation (3a) shows only what is here called coherent combining of terms of a (compensated) correlation, i.e. each term in a summation over a set of terms is accumulated taking into account both its magnitude and its sign. The method of the present invention also comprehends using a non-coherent combining of terms, i.e. reckoning a summation of only the magnitudes of terms in a set of terms, or, in other words, reckoning a summation of terms by taking the magnitude of each term to be summed and accumulating the magnitude in the summation without regard for the sign of the term. The invention comprehends forming a non-coherent combining of several different (full) correlations $c(n_{mf},k_{cp},w_c)$ (correlations over a single code period) for each replica code phase and for each fine frequency compensation factor, i.e. forming the non-coherent super correlation, $$\tilde{c}(n_{mf}, \hat{w} = w_c + w_f) = \quad (3b)$$

$$\frac{1}{K_{cp}N_{cp}} \sum_{k_{cp}=0}^{K_{cp}-1} \left\| \sum_{n_{se}=0}^{N_{se}-1} c(n_{mf}, k_{cp}, n_{se}, w_c)e^{-jw_f(n_{se}N_{ss}+k_{cp}N_{cp})} \right\|.$$

The invention also comprehends performing a non-coherent combining of either two or more super correlations so as to form the quantity (what might be called a grand correlation of type 1), $$\tilde{c}(n_{mf}, \hat{w} = w_c + w_f) = \frac{1}{M_N} \sum_{m_N=0}^{M_N-1} \|c(n_{mf}, \hat{w}_c)\| \quad (3c)$$

or performing a non-coherent combining of two or more non-coherent super correlations so as to form the quantity (what might be called a grand correlation of type 2), $$\tilde{c}(n_{mf}, \hat{w} = w_c + w_f) = \frac{1}{M_N} \sum_{m_N=0}^{M_N-1} \|\tilde{c}(n_{mf}, \hat{w}_c)\|. \quad (3d)$$

If the replica is not aligned with the incoming code, then the super correlation given by equation (3a) is small (due to properties of the spreading code), while if the replica and incoming code are aligned, the super correlation is large. Thus, the present invention differs from the prior art in that it uses an $N_{se}$-section correlator to provide $N_{se}$ correlations each over a different $1/N_{se}^{th}$ of a code period. These section correlations are then combined to form a (full, one-code-period-long) correlation, and then, as in the prior art, the correlations are accumulated over several full code periods to provide a super correlation. (As explained below, however, the present invention also provides for a balancing of various competing features of an acquisition system, namely aliasing cancellation, frequency resolution and bandwidth.)

When the received signal is aligned with the replica, as explained above, component-wise multiplication with the replica wipes-off the code component and transforms the received signal to pure sinusoidal modulation (data modulation is not taken into account), given by $$x_{n_{ss}n_{se}k_{cp}} = \exp(jw\{n_{ss} + n_{se}N_{ss} + k_{cp}N_{ss}N_{se}\}). \quad (4)$$

The correlation (a section correlation) performed by each section of the correlator adds the pure sinusoidal modulations (neglecting the data modulation) according to, $$x_{n_{se}k_{cp}} = \sum_{n_{ss}=0}^{N_{ss}-1} x_{n_{ss}n_{se}k_{cp}} \quad (5)$$

$$= \sum_{n_{ss}=0}^{N_{ss}-1} e^{jw\{n_{ss}+n_{se}N_{ss}+k_{cp}N_{ss}K_{cp}\}}$$

$$= e^{jwN_{ss}(n_{se}+k_{cp}N_{se})} \sum_{n_{ss}=0}^{N_{ss}-1} e^{jwn_{ss}}$$

$$= e^{jwN_{ss}(n_{se}+k_{cp}N_{se})} F_{ss}(w)$$

where $$F_{ss}(w) = \sum_{n_{ss}=0}^{N_{ss}-1} e^{jwn_{ss}} = e^{jw(N_{ss}-1)/2} \frac{\sin(wN_{ss}/2)}{\sin(w/2)}. \quad (6)$$

Thus, the multi-section sliding correlator acts like a lowpass filter when the replica and code component of the received signal are aligned; the low frequency sinusoids pass through the correlator, while high frequency sinusoids are suppressed.

Single-section Sliding Correlator

Although the present invention involves the use of a multi-section (sliding) correlator, to help understand the present invention, its application to a single-section sliding correlator is presented first. For the case of a single section correlator, i.e. $N_{se}=1$, and for a sampling rate $f_s=1/\Delta T$ (corresponding to $w=2\pi$) and number $N_{ss}$ of samples per code period (and per section in this case) such that $\Delta T \cdot N_{ss}=1$ ms, Ad the first zeroes of $F_{ss}(w)$ are at $\pm 1$ kHz. A frequency interval extending to $\pm 500$ Hz about any given coarse frequency is the search area for a fine frequency shift in this case, and fine frequency shifts of up to 500 Hz from a given coarse frequency are compensated for after the correlation operation, not before. Compensating for the fine frequency shift after the correlation operation is important if the output of the correlator is processed in parallel and for many frequencies in the 1 kHz interval about a coarse frequency since only one correlator processing stage is needed and the fine frequency compensation after the correlator is performed at a significantly slower rate, thus requiring less computational load.

In other words, in the first, conventional approach, there is a compensation for any shift in frequency performed before the correlation by multiplying the samples of the received signal by sinusoidal compensating factors $\exp(-j\hat{w}n)$ based on a trial frequency shift $\hat{w}$. Then the correlation (with the replica) is computed, requiring a multiplication by the replica code and the addition of all $K_{cp}N_{cp}$ intermediate results. Here the multiplications for frequency shift compensation are performed at the rate at which the incoming signal is sampled, and there is such a multiplication for each trial frequency (shift) within a 1 kHz range about a coarse trial frequency. In another, faster, approach, there is a compensation for only one frequency (a coarse frequency) before the correlation (requiring the addition of the $K_{cp}N_{cp}$ intermediate results), by multiplying the samples of the received signal by a coarse frequency compensation factor and then computing the correlation over $N_{cp}$ samples (one code period) for each of the $K_{cp}$ code periods, and saving the $K_{cp}$ outputs (correlations). Note that this is done for only one (coarse) frequency. Finally, the $K_{cp}$ one-period correlations are combined using different fine frequency correlation factors to obtain correlation results in the 1 kHz range around the coarse frequency. Thus, in the second, faster approach, for frequencies other than coarse frequency, only $K_{cp}$ inputs are required, compared to $K_{cp}N_{cp}$ inputs for the conventional calculation.

Nevertheless, as mentioned above, using a single-section correlator, even though the frequency shift is broken into a coarse and fine frequency shift search, has two drawbacks: aliasing, which can cause error of as much as 1 kHz, and a restriction on the search for a fine frequency shift to within 500 Hz of a coarse frequency shift.

Multi-section Sliding Correlator

Now, according to the present invention, a balancing of aliasing cancellation, frequency resolution and design bandwidth is performed using a multi-section sliding correlator. For a multi-section correlator of $N_{se}$ sections (in combination spanning one code period), the intrinsic bandwidth is the inverse of $1/N_{se}^{th}$ of a code period, i.e. the inverse of the interval spanned by a section of the correlator. An increase in $N_{se}$ increases the intrinsic bandwidth of the sliding correlator, as indicated by $F_{ss}(w)$. According to the invention, the fine frequency shift search is split in an analogous way; the sampling rate $1/\Delta T$ and number $N_{ss}$ of samples per section of the sliding correlator are adjusted such that $\Delta T \cdot N_{ss}<1$ ms. If, for example, $\Delta T \cdot N_{ss}=0.5$ ms for a 2-section correlator, then the first zeroes of $F_{ss}(w)$ are at $\pm 2$ kHz. Therefore, a coarse frequency shift grain of 2 kHz can be used, and fine frequency shifts in a 2 kHz interval about a coarse frequency shift can be compensated for after the correlator.

In general, with $N_{se}$ sections of the correlator, one can choose to increase the design bandwidth $N_{se}$ times (compared to the design bandwidth for a single-section correlator), but there is a tradeoff. Increasing the number $N_{se}$ of sections allows increasing the design bandwidth, but also increases the complexity of the acquisition. Since any implementation of an acquisition system according to equation (5)

will necessarily have finite resources (memory and computing index), the resources available for parallel processing in performing the fine frequency compensation and the required resolution of the acquisition dictate the design bandwidth and thus the number $N_{se}$ of sections for the correlator.

Striking a Desired Balance Between Aliasing Cancellation and Design Bandwidth

The competing goals of a large (design) bandwidth (frequency interval between adjacent coarse frequency shifts) and aliasing cancellation are addressed by proper choice of compensation factors. If $\hat{x}_{n_{se}k_{cp}} = e^{jwN_{ss}(n_{se}+k_{cp}N_{se})} F_{ss}(w)$ is the $(1/N_{se}^{th}$ of a period) section correlation provided by the correlator section corresponding to index $n_{se}$ at the code period $k_{cp}$ (so that w is here the actual angular fine frequency shift related to the actual fine frequency shift by $w=2\pi f/f_s$), then the output for the trial (angular) fine frequency shift $w_f$ is, according to the invention, to be compensated for using the compensating factor $e^{-jw_fN_{ss}(n_{se}+k_{cp}N_{se})}$, so that the overall, super correlation (over successive code periods) is given by, $$c(n_{mf}, \hat{w} = w_c + w_f) = \sum_{k_{cp}=0}^{K_{cp}-1} \sum_{n_{se}=0}^{N_{se}-1} e^{-jw_fN_{ss}(n_{se}+k_{cp}N_{se})} \hat{x}_{n_{se}k_{cp}}(n_{mf}, w_c). \quad (7)$$

Figure 5:
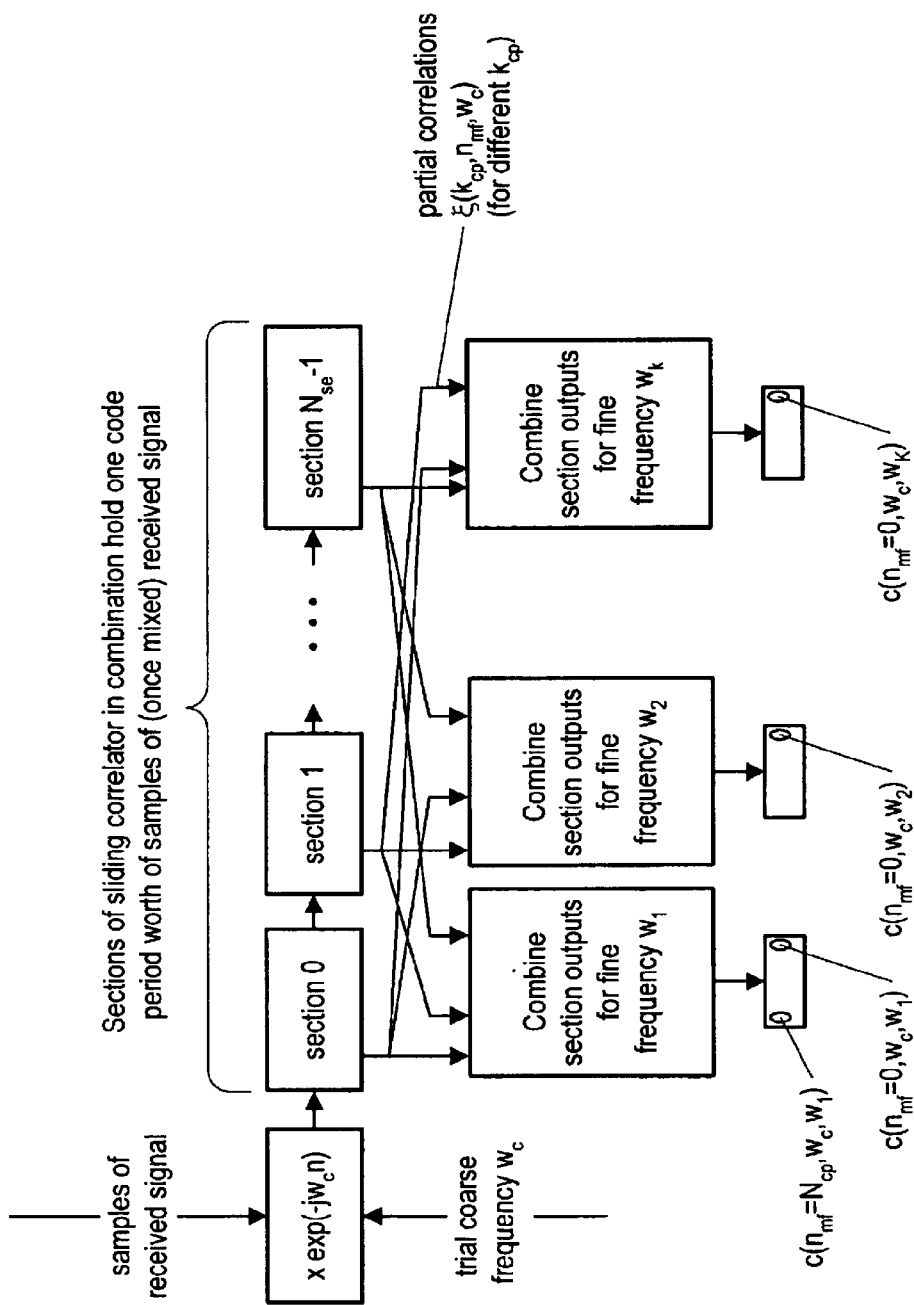
FIG. 5 is a schematic/block diagram of an acquisition process according to the present invention, an acquisition process similar to that illustrated in FIG. 4 but modified to provide larger bandwidth for fine frequencies and to provide aliasing cancellation (the aliasing being introduced by integration of the received signal with the replica code in computing a correlation of the received signal with the replica code) by using a multi-section sliding correlator and performing corresponding section correlations which are then combined (using a fine frequency shift compensation factor) to yield a (full) correlation for one code period (a full correlation which may be combined with full correlations for other code periods to yield a super correlation)

FIG. 5 illustrates an acquisition process according to equation (7), and so the acquisition process of FIG. 4 modified to provide aliasing cancellation by using a multi-section sliding correlator and performing corresponding section correlations which are then combined (using a fine frequency shift compensation factor) to yield a (full) correlation (for one code period), a correlation which may be combined with correlations for other code periods to yield a super correlation.

One should note that data modulation degrades the correlation result. The duration of a data bit is 20 msec in a typical GPS signal, which is why the accumulation of correlation results should never be performed for more than 20 code periods, preferably from 10 to 16 code periods.

By choosing a particular grid of fine frequencies, the above computation can be performed using a discrete Fourier transform (DFT). For example, the following grid allows the use of a DFT:

$$w_k = 2\pi \frac{k - N_k}{N_{ss}K_{cp}N_{se}}, \text{ for } k = 0, \ldots, \quad (8)$$

$$K_{cp}N_{se} - 1, \text{ and for } N - k = ceil[K_{cp}N_{se}/2].$$

where ceil[x] is a function (called the ceiling function) that yields the next integer after the number x, so that e.g. ceil[8.4]=9.

Substituting the above expression for $w_k$ in place of $w_f$ in equation (7) yields, $$c(n_{mf}, w_c, w_k) = \quad (9)$$

$$\sum_{k_{cp}=0}^{K_{cp}-1} \sum_{n_{se}=0}^{N_{se}-1} e^{\frac{2\pi jk(n_{se}+k_{cp}N_{se})}{K_{cp}N_{se}}} e^{\frac{2\pi jN_k(n_{se}+k_{cp}N_{se})}{K_{cp}N_{se}}} \hat{x}_{cpn_{se}}(n_{mf}, w_c)$$

where $$\exp\left\{\frac{2\pi jN_k(n_{se} + k_{cp}N_{se})}{K_{cp}N_{se}}\right\} \hat{x}_{cpn_{se}}(n_{mf}, w_c)$$

is a modulation of the outputs from the correlator sections, not related to the frequency shift compensation, required to shift the DFT. Equation (9) can be rewritten to make explicit the DFT. Using the notation $n_{es,se}=n_{se}+k_{cp}N_{se}$, $N_{cp,se}=K_{cp}N_{se}$, and $\hat{x}_{n_{cp,se}}=\hat{x}_{k_{cp}n_{es}}$, equation (9) becomes, $$c(n_{mf}, w_c, w_k) = \sum_{n_{cp,se}=0}^{N_{cp,se}-1} e^{\frac{-2\pi jkn_{cp,se}}{N_{cp,se}}} e^{\frac{2\pi jN_k n_{cp,se}}{N_{cp,se}}} \hat{x}_{n_{cp,se}} \quad (9')$$

$$= \sum_{n_{cp,se}=0}^{N_{cp,se}-1} e^{\frac{-2\pi jkn_{cp,se}}{N_{cp,se}}} \hat{\hat{x}}_{n_{cp,se}}$$

where $$\hat{\hat{x}}_{n_{cp,se}} = e^{\frac{2\pi jN_k n_{cp,se}}{N_{cp,se}}} \hat{x}_{n_{cp,se}}.$$

The single sum of equation (9') makes explicit that the correlation is a DFT of the quantity $\hat{\hat{x}}_{n_{cp,se}}$.

The frequency span for the case when a DFT is used is maximum, i.e. fine frequencies are in the range of $N_{se}$ kHz (meaning $\pm N_{se}/2$ kHz about any given coarse frequency shift), the maximum possible bandwidth. In other words, the design bandwidth is equal to the intrinsic bandwidth when a DFT is used, at least when a DFT is used without any special arrangements. When a DFT is applied in straightforward fashion, the resolution is $1/K_{cp}$ kHz.

Striking a Desired Balance Between Aliasing Cancellation and Bandwidth

According to the present invention, since the design bandwidth B of the acquisition process (i.e. the separation between coarse frequencies) is related to the fine frequency (shift) resolution $f_{res}$ and the number $N_f$ of fine frequencies between adjacent coarse frequencies according to the equation, $$B = f_{res}N_f, \quad (10)$$

two of the three parameters B, $f_{res}$, and $N_f$ are chosen independently to strike a desired balance between the contradictory requirements of aliasing cancellation (the more sections the better), design bandwidth (the smaller the design bandwidth, the better the aliasing cancellation), and frequency resolution or, correspondingly, parallelism (the greater the number of fine frequencies the greater the parallelism). The design bandwidth B is thus divided among $N_f$ subbands, i.e. among the $N_f$ fine frequencies spanning the interval between any two adjacent coarse frequencies. By our choice of fine frequency compensation factors, we affect the design bandwidth, i.e. we limit ourselves to all or only part of the intrinsic bandwidth of the sliding correlator.

In such an approach (choosing two of the three parameters B, $f_{res}$, and $N_f$), to perform the correlation calculation, the grid of fine frequencies corresponding to the example grid given by equation (8) should be changed to, $$w_k = 2\pi \frac{B}{B_{max}} \frac{k - N_k}{N_{ss}N_f}, \text{ for } k = 0, \ldots,$$ (11)

$N_f - 1$, and for $N_k = ceil[N_f/2]$.

where $B_{max} = N_{se}$ kHz is the intrinsic bandwidth, and where $w_k$ is a normalized angular frequency given by $w_k = 2\pi f_k \Delta T$ in which $1/\Delta T$ is the sampling rate (which is the same as $f_s$). However, such a grid cannot be used with the DFT. Using a DFT to perform the correlation does not allow controlling the design bandwidth (unless special techniques are used to allow controlling the design bandwidth). However, such a grid can be used to adjust the design bandwidth B when the correlation is performed using direct computation of the correlation according to equation (7) or other techniques for the fast computation of the correlation according to equation (7). Thus, here, the design bandwidth B and the number of fine frequencies $N_f$ are independently chosen, and the frequency resolution $f_{res}$ is that corresponding to the grid given by equation (11), i.e.

$$f_{res} = \frac{1}{2\pi} \frac{1}{\Delta T} \cdot abs\|w_k - w_{k-1}\| = \frac{B}{N_f} \frac{1}{B_{max}} \frac{1}{N_{ss}} \frac{1}{\Delta T}.$$ (12)

Instead of choosing the number of fine frequencies $N_f$ and the frequency resolution $f_{res}$, one can choose the design bandwidth B and the frequency resolution $f_{res}$, and then determine the number $N_f$ of fine frequencies between two adjacent coarse frequencies according to, $$N_f = ceil\left[\frac{B}{f_{res}}\right],$$ (13)

thus determining the parallelism of the acquisition system.

Thus by choosing any two of the three parameters, B, $N_f$, and $f_{res}$, the system is completely defined so as to achieve any desired trade-off between aliasing cancellation, bandwidth increase and frequency resolution.

Implementations

Figure 6:
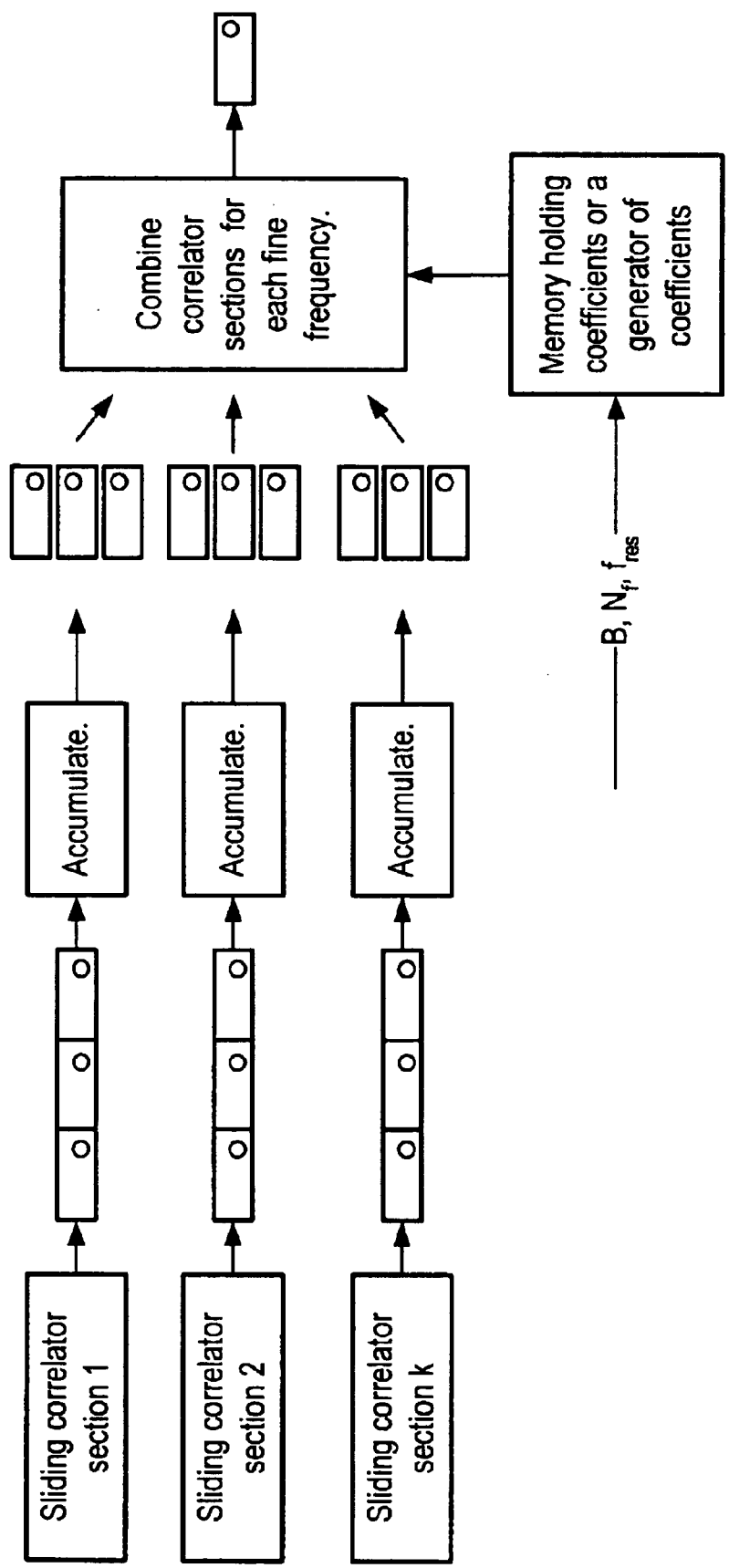
FIG. 6 is a schematic/block diagram of an implementation of an acquisition process according to the present invention, one in which section correlations are ultimately accumulated over several periods and then combined to form the correlator outputs at fine frequencies (i.e. for fine frequency shift values), and showing the using of system parameters (bandwidth, number of fine frequencies, and frequency resolution, only two of which are selected independently) to establish a balance between speed and accuracy of the acquisition.
Figure 7:
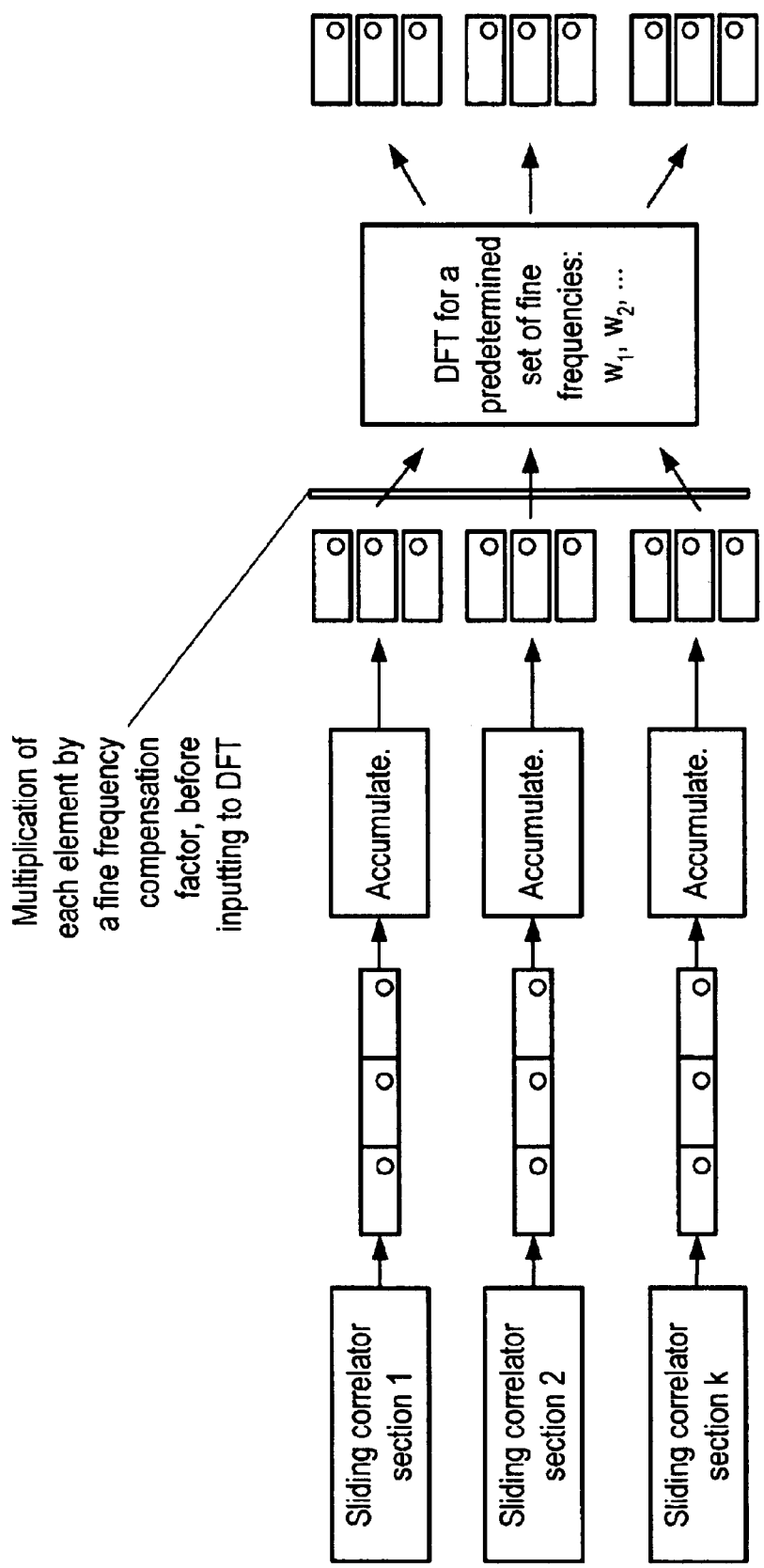
FIG. 7 is a schematic/block diagram of an implementation of an acquisition process based on the implementation illustrated in FIG. 6, but using a discrete Fourier transform (DFT) for performing the correlation computations at the fine frequencies.

FIG. 6 shows an implementation of the present invention in which section correlations are accumulated over several code periods, then used to compute the correlator outputs compensated based on various fine frequencies. The implementation of FIG. 6 can be based on the DFT technique, as indicated in FIG. 7, which shows an implementation in which the entire intrinsic bandwidth is used as the design bandwidth, although, as mentioned above, it is possible to use DFT to perform the correlations and adjust the design bandwidth to be less than the entire intrinsic bandwidth. FIG. 6 also shows providing as an input the three system parameters: design bandwidth B; the number of fine frequencies $N_f$; and the frequency resolution $f_{res}$ (the interval between adjacent fine frequencies). As explained above, according to the invention, any two of the three parameters are independently selected and the other parameter is determined based on the relation, $B = f_{res} \cdot N_f$.

Figure 8:
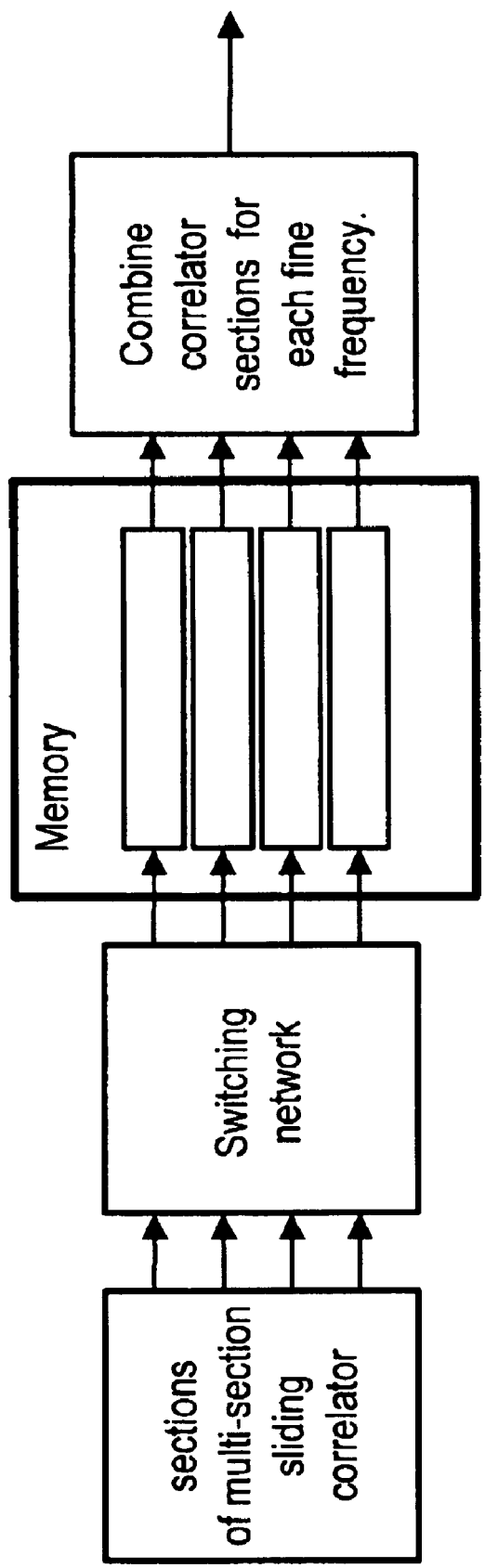
FIG. 8 is a schematic/block diagram indicating hardware components for the implementation illustrated in FIG. 6.
Figure 10:
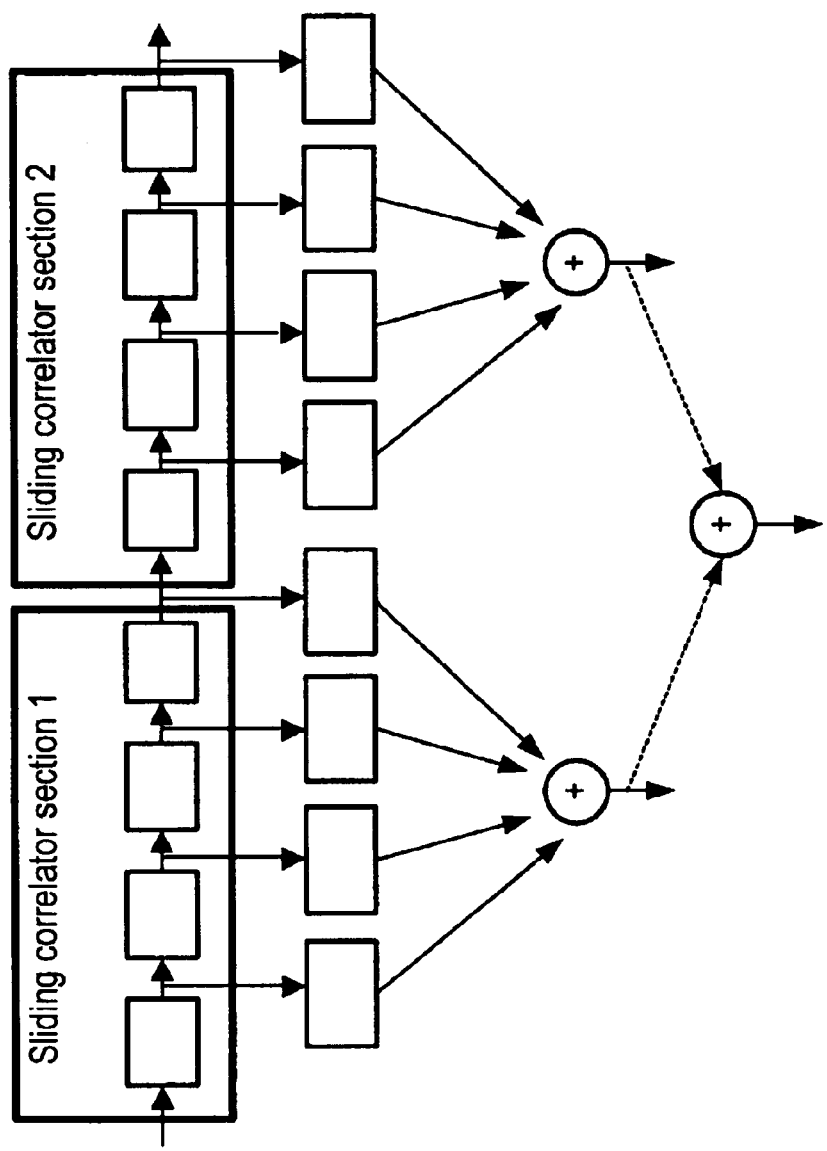
FIG. 10 is a schematic/block diagram of hardware components for implementing section correlations, the components including a block of shift registers and adders, the section correlation results being combined in a tree of adders so as to adjust the section lengths and even to form a full correlation output when necessary.

FIG. 8 illustrates an architecture for use in accumulating the section correlation results, an architecture providing memory resources that are allocated differently depending on the tradeoff desired between bandwidth, resolution, and aliasing cancellation. For a given sized memory on the output of the multi-section sliding correlator, one can trade the resolution for coarse frequency step (design bandwidth). The memory size is the code period multiplied by the number of correlator sections and also by the number of code periods. Thus, memory could be allocated either to the number of code periods (better frequency resolution) or to the number of sections (greater separation of coarse frequencies). A trading off between resolution and design bandwidth is done first by using appropriate fine frequency compensating factors $\exp\{-jw_fN_{ss}(n_{se}+k_{cp}N_{se})\}$. Secondly, correlations for variable section lengths can be made using a tree of adders (as indicated in FIG. 10 below), i.e. correlations can be made using one or another number of sections all of the same length, but a length chosen to give the desired tradeoff between bandwidth and resolution. The desired tradeoff is achieved by choosing how many fine frequencies to use and by choosing how many sections of a sliding correlator to implement.

Figure 9:
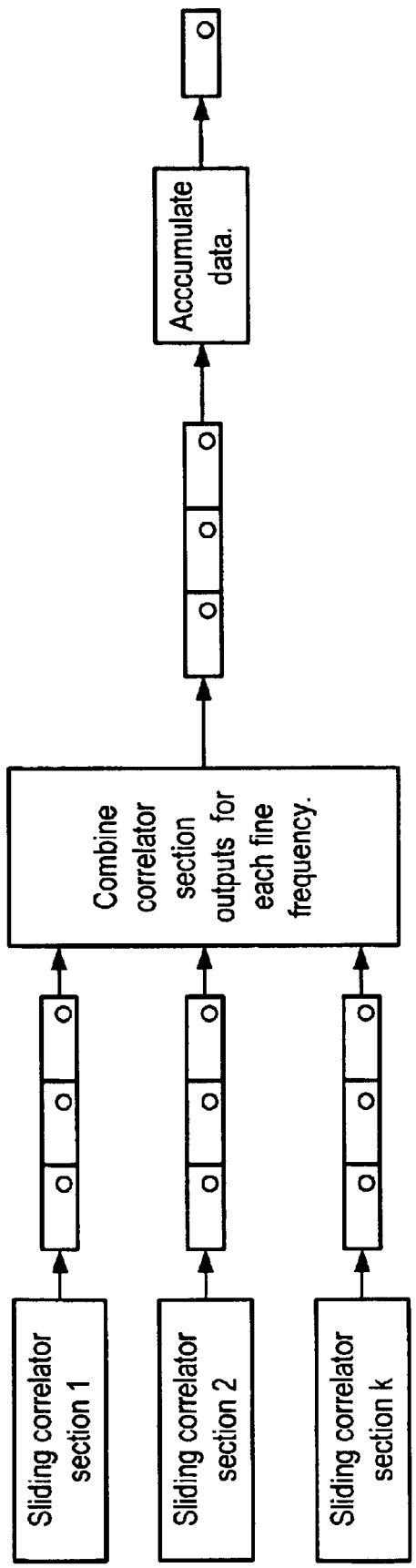
FIG. 9 is a schematic/block diagram of another implementation of an acquisition process according to the present invention, one in which section correlations are combined for a fine frequency and then accumulated over several periods.

FIG. 9 illustrates another implementation, one in which the effect of any frequency shift is compensated for in each section correlation, and the section correlations are then combined, for each fine frequency, to yield a (full) correlation, which are then (optionally) accumulated over several periods to yield a super correlation. No accumulation of section correlations is performed in such an implementation.

FIG. 10 illustrates one possible way of implementing the section correlations performed by either above implementation as a block of shift registers and adders. The section correlation results can then be combined to form section correlations of different lengths and even a (full) correlation output, i.e. a correlation over one entire code period, when needed.

Scope of the Invention

It is to be understood that the above-described arrangements are only illustrative of the application of the principles of the present invention. In particular, some of the computation required by an acquisition system according to the present invention can be performed outside of the device receiving the spread spectrum signal, such as by a component of a network using the spread spectrum signaling or by some outside network, i.e. a network external to the equipment hosting the receiver used to receive the signal to be acquired. In addition, other parallel and sequential architectures are comprehended besides what are expressly indicated herein, and numerous other modifications and alternative arrangements may be devised by those skilled in the art without departing from the spirit and scope of the present invention, and the appended claims are intended to cover such modifications and arrangements.

What is claimed is:

1. A method for acquiring a received spread spectrum signal, the received signal having a carrier component at a carrier frequency, a code component having a code period, and a data component, the acquiring including matching the phase of a replica of the code component to the phase of the received code component and also determining a possible shift in the carrier frequency away from a nominal carrier frequency, the acquiring having an intrinsic bandwidth that is substantially the inverse of a predetermined fraction of a code period and also having a design bandwidth that is a fraction of the intrinsic bandwidth including possibly the entire intrinsic bandwidth, the method comprising the steps of:

a) obtaining samples of the received signal spanning one code period after the received signal is demodulated at the nominal carrier frequency, the obtaining of the samples being performed at a sampling rate, the samples being distributed over a number of sections as a predetermined number of samples per section, the inverse of the product of the number of sections and the code period determining the intrinsic bandwidth;

b) determining a first frequency from among an ordered set of first frequencies spanning a frequency interval to be searched for the possible shift in the carrier frequency;

c) mixing a sinusoid at the first frequency with the samples of the received signal, to provide a once-mixed received signal segment;

d) assigning a value to the replica code phase, the assigning of a replica code phase amounting to associating a value of the replica code phase with a given position of the replica compared to the received signal;

e) performing a series of section correlations with the sections of replica code of the once-mixed received signal segment, the samples spanning one code period, each section correlation being calculated using one section of the replica, phase-shifted by the replica code phase, the series of section correlations including a first correlation performed over the samples spanning the first section, and so on;

f) determining an ordered set of second frequencies, the second frequencies lying in the interval between the selected first frequency and the next first frequency in the ordered set of first frequencies;

g) combining each of the section correlations using for the first section correlation a compensating factor including a sinusoid derived from the first second frequency in the ordered set of second frequencies, and so on, to provide a correlation with a code period of the replica at the code phase compensated by a compensating factor including a sinusoid derived from each of the frequencies in the ordered set of second frequencies; and h) repeating, for each further replica code phase in the ordered set of replica code phases, the series of section correlations and the combining of the section correlations for each replica code phase a number of times equal to the number of frequencies in the ordered set of second frequencies using a different compensating factor for each combining, the compensating factor for the first combining including a sinusoid derived from the first second frequency in the ordered set of second frequencies, and so on, to determine a correlation at each of the further replica code phases and, for each of such replica code phases, at each of the second frequencies;

wherein the parameter of design bandwidth is adjusted so as to alter characteristics of the acquisition.

2. The method of claim 1, wherein to achieve a desired tradeoff between design bandwidth in the sense of a portion of the frequency separation between successive first frequencies, cancellation of aliasing introduced by integration of the received signal with the replica code in computing a correlation of the received signal with the replica code, and frequency resolution, at least two parameters from among a set of at least three parameters including the design bandwidth B, the number of second frequencies $N_f$, and frequency resolution $f_{res}$, indicating the spacing between adjacent frequencies in the ordered set of second frequencies are independently selected, and the other parameter is determined based on the relation, $$B = f_{res} \cdot N_f.$$

3. The method of claim 2, wherein the design bandwidth B and number of second frequencies $N_f$ are independently selected, and the ordered set of second frequencies is then determined according to:

$$w_k = 2\pi \frac{B}{B_{max}} \frac{k - N_k}{N_{ss} N_f},$$

for $k = 0, \ldots, N_f - 1$, and for $N_k = \text{ceil}[N_f/2]$ in which ceil[x] represents the ceiling function, where the intrinsic bandwidth is given by $B_{max} = N_{se}$ kHz, in which $N_{se}$ is the number of sections over which the samples are distributed, where $N_{ss}$ is the number of samples per section, and where $w_k$ is a normalized angular frequency given by $w_k = 2\pi f_k \Delta T$ in which $1/\Delta T$ is the sampling rate, thus yielding as the frequency resolution $f_{res}$ a value given by $$f_{res} = \frac{B}{N_f}.$$

4. The method of claim 2, wherein the design bandwidth B and the frequency resolution $f_{res}$ are independently selected, and the number of second frequencies $N_f$ is then determined according to:

$$N_f = \text{ceil}\left[\frac{B}{f_{res}}\right],$$

in which ceil[x] represents the ceiling function.

5. The method of claim 2, wherein the number of second frequencies $N_f$ and the frequency resolution $f_{res}$ are independently selected, and the design bandwidth B is then determined according to:

$$B = f_{res} \cdot N_f.$$

6. The method of claim 1, wherein the combining of each of the section correlations is a coherent combining.

7. The method of claim 6, wherein the step of performing a series of section correlations is performed according to the procedure including the steps of:

as each new code period $k_{cp}$ of signal is received in an ordered set of $K_{cp}$ code periods of received signal, each code period of signal consisting of $N_{cp} = N_{ss} \cdot N_{se}$ samples $x(n_{ss} + n_{se} N_{ss} + k_{cp} N_{cp} + n_{mf})$, with $N_{se}$ equal to the number of sections, and $N_{ss}$ equal to the number of samples per section, and where $n_{ss} = 0, \ldots, N_{se} - 1$, and $n_{se} = 0, \ldots, N_{se} - 1$, and in which $n_{mf}$ is the replica code phase indicating a phase relationship between the replica and the received signal, multiplying the samples of the received signal by a coarse compensation factor $\exp\{-jw_c(n_{ss} + n_{se} N_{ss} + k_{cp} N_{cp})\}$ based on a selected first frequency $w_c$, calculating for each replica phase $n_{mf}$ the section correlation, $$c(n_{mf}, k_{cp}, n_{se}, w_c) = \sum_{n_{ss}=0}^{N_{ss}-1} r(n_{ss} + n_{se}N_{ss})x(n_{ss} + n_{se}N_{ss} + k_{cp}N_{cp} + n_{mf})e^{jw_c(n_{ss}+n_{se}N_{ss}+k_{cp}N_{cp})},$$

for $k_{cp}=0, \ldots, K_{cp}-1$, where $r(n_{ss}+n_{se}N_{ss})$ is the replica value at position $n_{ss}+n_{se}N_{ss}$, and storing the resulting section correlations;

and further wherein the step of coherently combining each of the section correlations, and the step of repeating, for each further replica code phase in the ordered set of replica code phases, the computing of the series of section correlations and their combining to form correlations, are performed according to the procedure including the step of:

using the stored section correlations $c(n_{mf}, k_{cp}, n_{se}, w_c)$, calculating the correlation $c(n_{mf}, k_{cp}, \hat{w}=w_c+w_f)$ according to, $$c(n_{mf}, k_{cp}, \hat{w} = w_c + w_f) = \frac{1}{N_{cp}} \sum_{n_{se}=0}^{N_{se}-1} c(n_{mf}, k_{cp}, n_{se}, w_c) e^{-jw_f(n_{se}N_{ss}+k_{cp}N_{cp})}$$

for each different second frequency $w_f$ in an ordered set of $N_f$ second frequencies lying in the interval between the selected first frequency and the next first frequency in the ordered set of first frequencies, and at each code phase $n_{mf}$.

8. The method of claim 7, further comprising the step of coherently combining correlation results over a plurality of code periods so as to form a super correlation $c(n_{mf}, \hat{w}=w_c+w_f)$, according to the prescription:

$$c(n_{mf}, \hat{w} = w_c + w_f) = \frac{1}{K_{cp}} \sum_{k_{cp}=0}^{K_{cp}-1} c(n_{mf}, k_{cp}, \hat{w} = w_c + w_f).$$

9. The method of claim 1, wherein at least some of the correlation calculations are performed using a discrete Fourier transform.

10. The method of claim 6, further comprising the step of performing, for each different replica code phase and second frequency compensation factor, a non-coherent combining of the correlations over different code periods.

11. The method of claim 8, further comprising the step of performing, for each different replica code phase and second frequency compensation factor, a non-coherent combining of two or more super correlations.

12. An apparatus for acquiring a received spread spectrum signal, the received signal having a carrier component at a carrier frequency, a code component having a code period, and a data component, the acquiring including matching the phase of a replica of the code component to the phase of the received code component and also determining a possible shift in the carrier frequency away from a nominal carrier frequency, the acquiring having an intrinsic bandwidth that is substantially the inverse of a predetermined fraction of a code period and also having a design bandwidth that is a fraction of the intrinsic bandwidth including possibly the entire intrinsic bandwidth, the apparatus comprising:

a) means for obtaining samples of the received signal spanning one code period after the received signal is demodulated at the nominal carrier frequency, the obtaining of the samples being performed at a sampling rate, the samples being distributed over a number of sections as a predetermined number of samples per section, the inverse of the product of the number of sections and the code period determining the intrinsic bandwidth;

b) means for determining a first frequency from among an ordered set of first frequencies spanning a frequency interval to be searched for the possible shift in the carrier frequency;

c) means for mixing a sinusoid at the first frequency with the samples of the received signal, to provide a once-mixed received signal segment;

d) means for assigning a value to the replica code phase, the assigning of a replica code phase amounting to associating a value of the replica code phase with a given position of the replica compared to the received signal;

e) means for performing a series of section correlations with the sections of replica code of the once-mixed received signal segment, the samples spanning one code period, each section correlation being calculated using one section of the replica, phase-shifted by the replica code phase, the series of section correlations including a first correlation performed over the samples spanning the first section, and so on;

f) means for determining an ordered set of second frequencies, the second frequencies lying in the interval between the selected first frequency and the next first frequency in the ordered set of first frequencies;

g) means for combining each of the section correlations using for the first section correlation a compensating factor including a sinusoid derived from the first second frequency in the ordered set of second frequencies, and so on, to provide a correlation with a code period of the replica at the code phase compensated by a compensating factor including a sinusoid derived from each of the frequencies in the ordered set of second frequencies; and h) means for repeating, for each further replica code phase in the ordered set of replica code phases, the series of section correlations and the combining of the section correlations for each replica code phase a number of times equal to the number of frequencies in the ordered set of second frequencies using a different compensating factor for each combining, the compensating factor for the first combining including a sinusoid derived from the first second frequency in the ordered set of second frequencies, and so on, to determine a correlation at each of the further replica code phases and, for each of such replica code phases, at each of the second frequencies;

wherein the parameter of design bandwidth is adjustable so as to alter characteristics of the acquisition.

13. The apparatus of claim 12, wherein to enable achieving a desired tradeoff between design bandwidth in the sense of a portion of the frequency separation between successive first frequencies, cancellation of aliasing introduced by integration of the received signal with the replica code in computing a correlation of the received signal with the replica code, and frequency resolution, at least two parameters from among a set of at least three parameters including the design bandwidth B, the number of second frequencies $N_f$, and frequency resolution $f_{res}$, indicating the spacing between adjacent frequencies in the ordered set of second frequencies are independently selectable, and the other parameter is determined based on the relation, $$B = f_{res} \cdot N_f.$$

14. The apparatus of claim 13, wherein the design bandwidth B and number of second frequencies $N_f$ are independently selectable, and the ordered set of second frequencies is determined according to:

$$w_k = 2\pi \frac{B}{B_{max}} \frac{k - N_k}{N_{ss} N_f},$$

for $k = 0, \ldots, N_f - 1$, and for $N_k = \text{ceil}[N_f/2]$ in which $\text{ceil}[x]$ represents the ceiling function, where the intrinsic bandwidth is given by $B_{max} = N_{se}$ kHz, in which $N_{se}$ is the number of sections over which the samples are distributed, where $N_{ss}$ is the number of samples per section, and where $w_k$ is a normalized angular frequency given by $w_k = 2\pi f_k \Delta T$ in which $1/\Delta T$ is the sampling rate, thus yielding as the frequency resolution $f_{res}$ a value given by $$f_{res} = \frac{B}{N_f}.$$

15. The apparatus of claim 13, wherein the design bandwidth B and the frequency resolution $f_{res}$ are independently selectable, and the number of second frequencies $N_f$ is then determined according to:

$$N_f = \text{ceil}\left[\frac{B}{f_{res}}\right],$$

in which $\text{ceil}[x]$ represents the ceiling function.

16. The apparatus of claim 13, wherein the number of second frequencies $N_f$ and the frequency resolution $f_{res}$ are independently selectable, and the design bandwidth B is then determined according to:

$$B = f_{res} \cdot N_f.$$

17. The apparatus of claim 12, wherein the combining of each of the section correlations is a coherent combining.

18. The apparatus of claim 17, wherein the means for performing a series of section correlations executes the procedure including the steps of:

as each new code period $k_{cp}$ of signal is received in an ordered set of $K_{cp}$ code periods of received signal, each code period of signal consisting of $N_{cp} = N_{ss} \cdot N_{se}$ samples $x(n_{ss} + n_{se} N_{ss} + k_{cp} N_{cp} + n_{mf})$, with $N_{se}$ equal to the number of sections, and $N_{ss}$ equal to the number of samples per section, and where $n_{ss} = 0, \ldots, N_{ss} - 1$ and $n_{se} = 0, \ldots, N_{se} - 1$, and in which $n_{mf}$ is the replica code phase indicating a phase relationship between the replica and the received signal, multiplying the samples of the received signal by a coarse compensation factor $\exp\{-jw_c(n_{ss} + n_{se} N_{ss} + k_{cp} N_{cp})\}$ based on a selected first frequency $w_c$, calculating for each replica phase $n_{mf}$ the section correlation, $$z(n_{mf}, k_{cp}, n_{se}, w_c) = \sum_{n_{ss}=0}^{N_{ss}-1} r(n_{ss} + n_{se} N_{ss}) x(n_{ss} + n_{se} N_{ss} + k_{cp} N_{cp} + n_{mf}) e^{-jw_c(n_{ss} + n_{se} N_{ss} + k_{cp} N_{cp})},$$

for $k_{cp} = 0, \ldots, K_{cp} - 1$, where $r(n_{ss} + n_{se} N_{ss})$ is the replica value at position $n_{ss} + n_{se} N_{ss}$, and storing the resulting section correlations;

and further wherein the means for coherently combining each of the section correlations, and the means for repeating, for each further replica code phase in the ordered set of replica code phases, the computing of the series of section correlations and their combining to form correlations, in combination execute the procedure including the step of:

using the stored section correlations $c(n_{mf}, k_{cp}, n_{se}, w_c)$, calculating the correlation $c(n_{mf}, k_{cp}, \hat{w} = w_c + w_f)$ according to, $$c(n_{mf}, k_{cp}, \hat{w} = w_c + w_f) = \frac{1}{N_{cp}} \sum_{n_{se}=0}^{N_{se}-1} c(n_{mf}, k_{cp}, n_{se}, w_c) e^{-jw_f(n_{se} N_{ss} + k_{cp} N_{cp})}$$

for each different second frequency $w_f$ in the ordered set of $N_f$ second frequencies lying in the interval between the selected first frequency and the next first frequency in the ordered set of first frequencies, and at each code phase $n_{mf}$.

19. The apparatus of claim 18, further comprising means for coherently combining correlation results over a plurality of code periods so as to form a super correlation $c(n_{mf}, \hat{w} = w_c + w_f)$, according to the prescription:

$$c(n_{mf}, \hat{w} = w_c + w_f) = \frac{1}{K_{cp}} \sum_{k_{cp}=0}^{K_{cp}-1} c(n_{mf}, k_{cp}, \hat{w} = w_c + w_f).$$

20. The apparatus of claim 12, wherein at least some of the correlation calculations are performed using a discrete Fourier transform.

21. The apparatus of claim 17, further comprising means for performing, for each different replica code phase and second frequency compensation factor, a non-coherent combining of the correlations over different code periods.

22. The apparatus of claim 19, further comprising means for performing, for each different replica code phase and second frequency compensation factor, a non-coherent combining of two or more super correlations.

23. A system for acquiring a received spread spectrum signal, the received signal having a carrier component at a carrier frequency, a code component having a code period, and a data component, the acquiring including matching the phase of a replica of the code component to the phase of the received code component and also determining a possible shift in the carrier frequency away from a nominal carrier frequency, the acquiring having an intrinsic bandwidth that is substantially the inverse of a predetermined fraction of a code period and also having a design bandwidth that is a fraction of the intrinsic bandwidth including possibly the entire intrinsic bandwidth, the system comprising:

a) a receiver, for receiving the spread spectrum signal;
b) means for obtaining samples of the received signal spanning one code period after the received signal is demodulated at the nominal carrier frequency, the obtaining of the samples being performed at a sampling rate, the samples being distributed over a number of sections as a predetermined number of samples per section, the inverse of the product of the number of sections and the code period determining the intrinsic bandwidth;

c) means for determining a first frequency from among an ordered set of first frequencies spanning a frequency interval to be searched for the possible shift in the carrier frequency;

d) means for mixing a sinusoid at the first frequency with the samples of the received signal, to provide a once-mixed received signal segment;

e) means for assigning a value to the replica code phase, the assigning of a replica code phase amounting to associating a value of the replica code phase with a given position of the replica compared to the received signal;

f) means for performing a series of section correlations with the sections of replica code of the once-mixed received signal segment, the samples spanning one code period, each section correlation being calculated using one section of the replica, phase-shifted by the replica code phase, the series of section correlations including a first correlation performed over the samples spanning the first section, and so on;

g) means for determining an ordered set of second frequencies, the second frequencies lying in the interval between the selected first frequency and the next first frequency in the ordered set of first frequencies;

h) combining each of the section correlations using for the first section correlation a compensating factor including a sinusoid derived from the first second frequency in the ordered set of second frequencies, and so on, to provide a correlation with a code period of the replica at the code phase compensated by a compensating factor including a sinusoid derived from each of the frequencies in the ordered set of second frequencies; and i) means for repeating, for each further replica code phase in the ordered set of replica code phases, the series of section correlations and the combining of the section correlations for each replica code phase a number of times equal to the number of frequencies in the ordered set of second frequencies using a different compensating factor for each combining, the compensating factor for the first combining including a sinusoid derived from the first second frequency in the ordered set of second frequencies, and so on, to determine a correlation at each of the further replica code phases and, for each of such replica code phases, at each of the second frequencies;

wherein the parameter of design bandwidth is adjustable so as to alter characteristics of the acquisition.

24. The system of claim 23, wherein to enable achieving a desired tradeoff between design bandwidth in the sense of a portion of the frequency separation between successive first frequencies, cancellation of aliasing introduced by integration of the received signal with the replica code in computing a correlation of the received signal with the replica code, and frequency resolution, at least two parameters from among a set of at least three parameters including the design bandwidth B, the number of second frequencies $N_f$, and frequency resolution $f_{res}$, indicating the spacing between adjacent frequencies in the ordered set of second frequencies are independently selectable, and the other parameter is determined based on the relation, $$B = f_{res} \cdot N_f.$$

25. The system of claim 24, wherein the design bandwidth B and number of second frequencies $N_f$ are independently selectable, and the ordered set of second frequencies is determined according to:

$$w_k = 2\pi \frac{B}{B_{max}} \frac{k - N_k}{N_{ss} N_f},$$

for $k=0, \ldots, N_f-1$, and for $N_k = \text{ceil}[N_f/2]$ in which ceil[x] represents the ceiling function, where the intrinsic bandwidth is given by $B_{max} = N_{se}$ kHz, in which $N_{se}$ is the number of sections over which the samples are distributed, where $N_{ss}$ is the number of samples per section, and where $w_k$ is a normalized angular frequency given by $w_k = 2\pi f_k \Delta T$ in which $1/\Delta T$ is the sampling rate, thus yielding as the frequency resolution $f_{res}$ a value given by $$f_{res} = \frac{B}{N_f}.$$

26. The system of claim 24, wherein the design bandwidth B and the frequency resolution $f_{res}$ are independently selectable, and the number of second frequencies $N_f$ is then determined according to:

$$N_f = \text{ceil}\left[\frac{B}{f_{res}}\right],$$

in which ceil[x] represents the ceiling function.

27. The system of claim 24, wherein the number of second frequencies $N_f$ and the frequency resolution $f_{res}$ are independently selectable, and the design bandwidth B is then determined according to:

$$B = f_{res} \cdot N_f.$$

28. The system of claim 23, wherein the combining of each of the section correlations is a coherent combining.

29. The system of claim 28, wherein the means for performing a series of section correlation s executes the procedure including the steps of:

as each new code period $k_{cp}$ of signal is received in an ordered set of $K_{cp}$ code periods of received signal, each code period of signal consisting of $N_{cp} = N_{ss} \cdot N_{se}$ samples $x(n_{ss} + n_{se} N_{ss} + k_{cp} N_{cp} + n_{mf})$, with $N_{se}$ equal to the number of sections, and $N_{ss}$ equal to the number of samples per section, and where $n_{ss} = 0, \ldots, N_{ss}-1$, and $n_{se} = 0, \ldots, N_{se}-1$, and in which $n_{mf}$ is the replica code phase indicating a phase relationship between the replica and the received signal, multiplying the samples of the received signal by a coarse compensation factor $\exp\{-jw_c(n_{ss} + n_{se} N_{ss} + k_{cp} N_{cp})\}$ based on a selected first frequency $w_c$, calculating for each replica phase $n_{mf}$ the section correlation, $$z(n_{mf}, k_{cp}, n_{se}, w_c) = \sum_{n_{ss}=0}^{N_{ss}-1} r(n_{ss} + n_{se}N_{ss})x(n_{ss} + n_{se}N_{ss} + k_{cp}N_{cp} + n_{mf})e^{-jw_c(n_{ss}+n_{se}N_{ss}+k_{cp}N_{cp})},$$

for $k_{cp}=0, \ldots, K_{cp}-1$, where $r(n_{ss}+n_{se}N_{ss})$ is the replica value at position $n_{ss}+n_{se}N_{ss}$, and storing the resulting section correlations;

and further wherein the means for coherently combining each of the section correlations, and the means for repeating, for each further replica code phase in the ordered set of replica code phases, the computing of the series of section correlations and their combining to form correlations, in combination execute the procedure including the step of:

using the stored section correlations $c(n_{mf},k_{cp},n_{se},w_c)$, calculating the correlation $c(n_{mf},k_{cp},\hat{w}=w_c+w_f)$ according to, $$c(n_{mf}, k_{cp}, \hat{w} = w_c + w_f) = \frac{1}{N_{cp}} \sum_{n_{se}=0}^{N_{se}-1} c(n_{mf}, k_{cp}, n_{se}, w_c)e^{-jw_f(n_{se}N_{ss}+k_{cp}N_{cp})}$$

for each different second frequency $w_f$ in the ordered set of $N_f$ second frequencies lying in the interval between the selected first frequency and the next first frequency in the ordered set of first frequencies, and at each code phase $n_{mf}$.

30. The system of claim 29, further comprising means for coherently combining correlation results over a plurality of code periods so as to form a super correlation $c(n_{mf},\hat{w}=w_c+w_f)$, according to the prescription:

$$c(n_{mf}, \hat{w} = w_c + w_f) = \frac{1}{K_{cp}} \sum_{k_{cp}=0}^{K_{cp}-1} c(n_{mf}, k_{cp}, \hat{w} = w_c + w_f).$$

31. The system of claim 23, wherein at least some of the correlation calculations are performed using a discrete Fourier transform.

32. The system of claim 23, wherein at least some of the calculation of the correlation of the correlations are performed by computing facilities external to the receiver, such as by computing facilities that are part of an outside network.

33. The system of claim 28, further comprising means for performing, for each different replica code phase and second frequency compensation factor, a non-coherent combining of the correlations over different code periods.

34. The system of claim 30, further comprising means for performing, for each different replica code phase and second frequency compensation factor, a non-coherent combining of two or more super correlations.

* * * * *

UNITED STATES PATENT AND TRADEMARK OFFICE
CERTIFICATE OF CORRECTION

PATENT NO. : 6,735,243 B1
DATED : May 11, 2004
INVENTOR(S) : David Akopian

It is certified that error appears in the above-identified patent and that said Letters Patent is hereby corrected as shown below:

Column 20,
Line 62, delete "$n_{ss} = 0,...,N_{se} -1$" and substitute -- $n_{ss} = 0,...,N_{ss} -1$ --.

Column 21,
Line 7, delete "$e^{jw_c(n_{ss}+n_{se}N_{ss}+k_{cp}N_{cp})}$" and substitute -- $e^{-jw_c(n_{ss}+n_{se}N_{ss}+k_{cp}N_{cp})}$ --.

Column 26,
Line 54, delete "correlation s" and substitute -- correlations --.

Signed and Sealed this

Eighth Day of February, 2005

JON W. DUDAS
*Director of the United States Patent and Trademark Office*